(12) United States Patent
Finn

(10) Patent No.: US 7,597,250 B2
(45) Date of Patent: Oct. 6, 2009

(54) RFID READER WITH MULTIPLE INTERFACES

(75) Inventor: David Finn, Mayo County (IE)

(73) Assignee: DPD Patent Trust Ltd., Tourmakeady, County Mayo (IE)

( * ) Notice: Subject to any disclaimer, the term of this patent is extended or adjusted under 35 U.S.C. 154(b) by 485 days.

(21) Appl. No.: 11/420,747

(22) Filed: May 27, 2006

(65) Prior Publication Data

US 2006/0219776 A1    Oct. 5, 2006

Related U.S. Application Data

(63) Continuation-in-part of application No. 11/381,389, filed on May 3, 2006, and a continuation-in-part of application No. 11/355,264, filed on Feb. 15, 2006, and a continuation-in-part of application No. 10/990,296, filed on Nov. 16, 2004, now Pat. No. 7,213,766.

(60) Provisional application No. 60/602,595, filed on Aug. 18, 2004, provisional application No. 60/562,204, filed on Apr. 14, 2004, provisional application No. 60/520,698, filed on Nov. 17, 2003, provisional application No. 60/652,895, filed on Feb. 15, 2005, provisional application No. 60/660,398, filed on Mar. 10, 2005, provisional application No. 60/664,974, filed on Mar. 24, 2005, provisional application No. 60/734,409, filed on Nov. 8, 2005, provisional application No. 60/725,818, filed on Oct. 12, 2005, provisional application No. 60/708,707, filed on Aug. 16, 2005, provisional application No. 60/708,628, filed on Aug. 16, 2005, provisional application No. 60/691,337, filed on Jun. 16, 2005, provisional application No. 60/685,503, filed on May 27, 2005.

(51) Int. Cl.
*G06K 5/00* (2006.01)
*G06K 7/08* (2006.01)
*G06K 19/06* (2006.01)

(52) U.S. Cl. .................. 235/380; 235/375; 235/451; 235/487; 235/492

(58) Field of Classification Search ................. 235/451, 235/492, 380, 375
See application file for complete search history.

(56) References Cited

U.S. PATENT DOCUMENTS 4,367,965 A    1/1983    Speitel et al.

(Continued)

FOREIGN PATENT DOCUMENTS

DE    19631050    2/1998

(Continued)

OTHER PUBLICATIONS

*ACR38CT Contactless SIM Tracker Technical Specification*, Advanced Card Systems Ltd., Hong Kong.

(Continued)

*Primary Examiner*—Thien M. Le
*Assistant Examiner*—Tuyen K Vo
(74) *Attorney, Agent, or Firm*—Gerald E. Linden; Dwight A. Stauffer

(57) ABSTRACT

A pocket-size RFID reader apparatus having a contactless interface and a slot for insertion of a contactless smart card fob, and having a biometric sensor, thereby providing two levels of personalization. The apparatus may have a wireless interface; and a slot for insertion of a wireless SD I/O device. The apparatus may have a slot for insertion of an external memory device. The apparatus may have a mechanical connection (contact) interface. The apparatus may also have an RF interface for reading an electronic immobilizer within the apparatus.

21 Claims, 4 Drawing Sheets

U.S. PATENT DOCUMENTS

| | | | |
|---|---|---|---|
| 5,761,648 A | 6/1998 | Golden et al. | |
| 6,067,235 A | 5/2000 | Finn et al. | |
| 6,078,908 A * | 6/2000 | Schmitz | 705/50 |
| 6,085,320 A | 7/2000 | Kaliski, Jr. | |
| 6,148,354 A | 11/2000 | Ban et al. | |
| 6,168,077 B1 | 1/2001 | Gray et al. | |
| 6,189,098 B1 | 2/2001 | Kaliski, Jr. | |
| 6,240,184 B1 | 5/2001 | Huynh et al. | |
| 6,283,658 B1 | 9/2001 | Estevez et al. | |
| 6,342,839 B1 | 1/2002 | Curkendall et al. | |
| 6,370,603 B1 | 4/2002 | Silverman et al. | |
| 6,385,677 B1 | 5/2002 | Yao | |
| 6,398,116 B1 | 6/2002 | Kreft | |
| 6,505,773 B1 | 1/2003 | Palmer et al. | |
| 6,543,690 B2 | 4/2003 | Leydier et al. | |
| 6,567,273 B1 | 5/2003 | Liu et al. | |
| 6,592,031 B1 | 7/2003 | Klatt | |
| 6,639,957 B2 * | 10/2003 | Cahill-O'Brien et al. | 375/354 |
| 6,658,516 B2 | 12/2003 | Yao | |
| 6,694,399 B1 | 2/2004 | Leydier et al. | |
| 6,724,680 B1 | 4/2004 | Ng et al. | |
| 6,744,634 B2 | 6/2004 | Yen | |
| 6,748,541 B1 | 6/2004 | Margalit et al. | |
| 6,752,321 B1 | 6/2004 | Leaming | |
| 6,763,399 B2 | 7/2004 | Margalit et al. | |
| 6,772,956 B1 | 8/2004 | Leaming | |
| 6,798,169 B2 | 9/2004 | Stratmann et al. | |
| 6,801,956 B2 | 10/2004 | Feuser et al. | |
| 6,813,164 B2 | 11/2004 | Yen | |
| 6,839,772 B1 | 1/2005 | Kowalski et al. | |
| 6,848,045 B2 | 1/2005 | Long et al. | |
| 6,876,420 B2 | 4/2005 | Hong et al. | |
| 6,879,597 B2 | 4/2005 | Tordera et al. | |
| 6,983,888 B2 | 1/2006 | Weng | |
| 7,248,834 B2 | 7/2007 | Matsuo et al. | |
| 2001/0043702 A1 | 11/2001 | Elteto et al. | |
| 2001/0054148 A1 | 12/2001 | Hoonaert et al. | |
| 2002/0011516 A1 | 1/2002 | Lee | |
| 2002/0073340 A1 * | 6/2002 | Mambakkam et al. | 713/202 |
| 2002/0095608 A1 * | 7/2002 | Slevin | 713/202 |
| 2003/0000267 A1 | 1/2003 | Jacob et al. | |
| 2003/0028797 A1 | 2/2003 | Long et al. | |
| 2003/0087601 A1 | 5/2003 | Agam et al. | |
| 2003/0102380 A1 | 6/2003 | Spencer | |
| 2003/0141365 A1 | 7/2003 | Sowa et al. | |
| 2003/0169152 A1 | 9/2003 | Charrat et al. | |
| 2003/0236821 A1 | 12/2003 | Jiau | |
| 2004/0073726 A1 | 4/2004 | Margalit et al. | |
| 2004/0129787 A1 | 7/2004 | Saito et al. | |
| 2004/0188519 A1 * | 9/2004 | Cassone | 235/382 |
| 2004/0201457 A1 * | 10/2004 | O'Toole et al. | 340/10.33 |
| 2004/0230831 A1 * | 11/2004 | Spelman et al. | 713/201 |
| 2005/0035200 A1 | 2/2005 | Hendrick | |
| 2005/0109841 A1 | 5/2005 | Finn | |
| 2005/0274803 A1 | 12/2005 | Lee | |
| 2006/0148404 A1 | 7/2006 | Wakim | |
| 2006/0161789 A1 * | 7/2006 | Doughty et al. | 713/186 |
| 2006/0206582 A1 | 9/2006 | Finn | |
| 2006/0208066 A1 | 9/2006 | Finn | |
| 2007/0055633 A1 | 3/2007 | Cheon et al. | |
| 2007/0250707 A1 | 10/2007 | Noguchi | |
| 2007/0263596 A1 | 11/2007 | Carrat | |
| 2008/0032626 A1 | 2/2008 | Chen | |

FOREIGN PATENT DOCUMENTS

| | | |
|---|---|---|
| DE | 100 60 866 C1 | 2/2002 |
| HK | 1063994 | 12/2004 |
| HK | 1063995 | 12/2004 |
| JP | 2004246720 | 9/2004 |
| WO | WO99 38062 | 7/1999 |
| WO | WO99 52051 | 10/1999 |
| WO | WO00 36252 | 6/2000 |
| WO | WO00 42491 | 7/2000 |
| WO | WO00 65180 | 11/2000 |
| WO | WO00 75755 | 12/2000 |
| WO | WO01 14179 | 3/2001 |
| WO | WO01 38673 | 3/2001 |
| WO | WO01 48339 | 7/2001 |
| WO | WO01 48342 | 7/2001 |
| WO | WO01 61692 | 8/2001 |
| WO | WO01 39102 | 11/2001 |
| WO | WO01 88693 | 11/2001 |
| WO | WO01 96990 | 12/2001 |
| WO | WO03 014887 | 2/2003 |
| WO | WO03 034189 | 4/2003 |
| WO | WO2004 002058 | 12/2003 |
| WO | WO2004 081706 | 9/2004 |
| WO | WO2004 081769 | 9/2004 |
| WO | WO2005 022288 | 3/2005 |

OTHER PUBLICATIONS

*ACR38DT Dual Key Technical Specifications*, Version 1.3, Sep. 2004, Advanced Card Systems Ltd., Hong Kong.

*Dallas Semiconductor DS1490F 2-in-1 Fob*, Dallas Semiconductor, Dallas TX.

*Dallas Semiconductor DS9490R-DS9490B USB to 1-Wire/iButton Adaptor*, Maxim I-C, Sunnyvale CA.

*Matsushita blends FERAM technology with smart cards*, Hara, Yoshiko, EE Times, Oct. 1, 2004, CMP Media, Manhasset NY.

*Japan's Matsushita developing memory cards with smart chip function*, Oct. 1, 2004, Mercury News, San Jose CA.

*OTi-6828 Flash Disk Controller*, Ours Technology Inc., Taiwan.

*Panasonic Develops RFID smartSD Card*, Oct. 4, 2004, Palminfocenter.com, Sunnyvale CA.

*Panasonic Develops Industry's First SD Memory Card with Contacless Smart Card Capabilities*, Oct. 1, 2004, The Japan Corporate News Network, Tokyo.

*Panasonic's Smart SD adds RFID to the mix*, Rojas, Peter, Oct. 4, 2004, Engadget LLC, New York NY.

*Delivering ultimate security, high performance and ultra low power consumption, SmartMX is now in volume supply*, Nov. 18-20, 2003, Cartes 2003, aris Nort Villepinte, France.

*Digital Rights pits SIMS against Flash Cards, Card Technology*, Balaban, Dan, Nov. 2004, pp. 24, 25, 26, 28, 30, Card Technology, Chicago IL.

*Smart MX P5CT072 Secure Dual Interface PKI Smart Card Controller*, Rev. 1.3, Oct. 2004, Koninklijke Philips Electronics NV, The Netherlands.

*Vodafone KK Develops Contactless Smart Card Mobile Handset*, May 6, 2004, HiTEK Magazine, Dubai.

*SmartSD Card Structure*, Panasonic.

*Be.U mobile SMC-800MCW*, Ruggedized Handheld Reader for ID Verification, Labcal, Quebec Canada (www.labcal.com), 2 pages.

*Be.U mobileSMC-800MCW*, Applications for the Be.U Mobile, Labcal, Quebec Canada (www.labcal.com), 1 page.

*Be.U mobile SMC-800MW*, Ruggedized Handheld Reader for ID Verification, Labcal, Quebec Canada (www.labcal.com), 2 pages.

*Smartprint Enroller (SDE-1000)*, Fast and Secure Enrollment Station, Labcal, Quebec Canada (www.labcal.com), 2 pages.

*Smartprint Mobile Checker (SMC-500)*, Compact and Secure Handheld Device, Labcal, Quebec Canada (www.labcal.com), 2 pages.

*TruBlu Fingerprint Biometric Reader*, Fingerprint reader for user Identification or ID Authentication, Labcal, Quebec Canada (www.labcal.com), 2 pages.

\* cited by examiner

RFID READER WITH MULTIPLE INTERFACES

CROSS-REFERENCE TO RELATED APPLICATIONS

This is a continuation-in-part of U.S. Ser. No. 10/990,296 filed Nov. 16, 2004 (published as 20050109841 May 26, 2005), claiming priority of
  Provisional Application No. 60/602,595 filed Aug. 18, 2004
  Provisional Application No. 60/562,204 filed Apr. 14, 2004
  Provisional Application No. 60/520,698 filed Nov. 17, 2003
This is a continuation-in-part of U.S. Ser. No. 11/355,264 filed Feb. 15, 2006, claiming priority of
  Provisional Application No. 60/652,895 filed Feb. 15, 2005.
  Provisional Application No. 60/660,398 filed Mar. 10, 2005.
  Provisional Application No. 60/664,974 filed Mar. 24, 2005.
This is a continuation-in-part of U.S. Ser. No. 11/381,389 filed 03 May 2006
This is a non-provisional filing of:
  Provisional Application No. 60/734,409 filed Nov. 08, 2005
  Provisional Application No. 60/725,818 filed Oct. 12, 2005
  Provisional Application No. 60/708,707 filed Aug. 16, 2005
  Provisional Application No. 60/708,628 filed Aug. 16, 2005
  Provisional Application No. 60/691,337 filed Jun. 16, 2005
  Provisional Application No. 60/685,503 filed May 27, 2005
All of the above are incorporated (in their entirety) by reference herein, and all of the above name David Finn as an inventor.

TECHNICAL FIELD OF THE INVENTION

This invention relates to contactless smart card technology and to RFID (radio frequency identification) reader technology.

BACKGROUND OF THE INVENTION

In the corporate environment, contactless technology is used in access control (physical), network logon (logical) and for authenticating a document, an email, a file or any form of written communication with a digital signature, certificate, password or cryptographic key (Public & Private Key Infrastructure).

In secure identification applications, contactless technology is often married with biometric identifiers storing the template of a fingerprint, facial image, blood veins pattern of a hand or iris scan in the memory of the RFID chip. For example, at security checkpoints in an airport, contactless smart cards can be used to enable faster passage of "registered travelers" or "frequent travelers" through special security lanes. The biometric kiosks equipped with an RFID reader compare the image presented by the traveler to data stored on the contactless smart card to verify that the traveler is the same person.

In a move towards greater border control, travel documents need to be tamper-proof machine—readable passports (MRP) that incorporate contactless IC chips, as well as biometric identifiers that comply with standards established by ICAO (International Civil Aviation Organization).

Chip-based contactless smart cards and keychain fobs loaded with payment applications are used by commuters in mass transit to pay fares. To conduct the transaction the commuter simply taps their contactless card on a reader which deducts the price of the ticket or fare from the stored value in the memory of the RFID chip. This Tap-and-Go technology is also used in convenience stores, cafes, pharmacies and movie theaters to make low-value purchases that don't require a cardholder signature. Contactless electronic payment applications also include vending, ticketing, parking, toll collection and redemption of vouchers, points or coupons earned from a merchant loyalty program.

In another example, a consumer can load cash to the electronic purse of the contactless smart card via Internet banking, and while still connected to the PC use the stored value to pay for online products or services. Equally, a consumer can load electronic cash to the contactless smart card and use the e-cash at participating merchants to pay for goods and services.

NFC (Near Field Communication) enabled devices, including mobile phones, have contactless chips that can function like payment cards and download ticketing and other information from chip embedded "smart posters". Mobile telephones are also used for small value purchases, to pay for parking meters, taxi fares and vending machine items.

Contactless chip card technology is based on two standards: ISO/IEC 14443 Type A and Type B (for proximity cards), and ISO/IEC 15693 (for vicinity cards). Cards that comply with these standards operate at the 13.56 MHz frequency. ISO/IEC 14443 products have a range of up to 10 cm (centimeters), while ISO/IEC 15693 products can operate at a range between 50 and 70 cm.

In the above applications the contactless smart card or fob is a passive device and a separate entity to the RFID reader. In standard use, the reader is a stationary device connected to a PC or integrated into a terminal or kiosk.

Portable mobile handheld readers with multiple interfaces are known. See, for example, standard POS terminals from Hypercom (www.hypercom.com) and Ingenico (www.ingenico.com).

For example, conventional POS (Point of Sale) terminals are used by merchants to charge an amount owed on purchases by swiping a credit card or inserting a contact/contactless smart card and by entering a PIN (personal identification number) into the reader, then seeking clearance of payment by communicating in wireless mode with the network which dials up the respective payment clearing center or trust center for acceptance of the purchase amount. These devices are handheld and portable, but are not well suited for carrying around in your pocket, because of their weight (approximately 700 grams) and size (bulky, because of their requirement for battery power). The wireless interface is for communicating with a central server over the Wi-Fi network in a store, for authorization of a credit card payment.

Handheld readers are also used for ID verification in mobile applications such as;
  Employee ID in large restricted areas (e.g. airports, seaports, military bases and ships) and attended access control gates
  Cross border control to authenticate travel documents (e-Passport and Visa) from a citizen of any nation
  National ID to verify a holder of a government ID card
  These handheld readers support several types of cards; contact (ISO 7816), contactless (ISO 14443 type A/B, MIFARE, DESFire) and incorporate a biometric fingerprint sensor (3-D capacitive) to authenticate the employee's or citizen's fingerprint against the fingerprint template stored on the card and to display his/her credentials along with results. Using the wireless communication interface (via a standard access point), the reader obtains constant access to updated information on the database servers. The reader can also communicate with the servers through cellular technologies like GSM (GPRS) or CDMA.

The company Labcal in Canada is working in this area. See http://www.labcal.com/. For example, Labcal's Be.U Mobile SMC-800 MCW is a handheld unit for checking the identity of an employee in large restricted areas. The employee's credentials, including a biometric template of his or her fingerprint is stored in the memory of the ID chip card or contactless card. The access control guard simply inserts the card into the handheld unit and all information pertaining to the individual is shown on the display. The guard can also scan a live fingerprint and compare it with the template stored in the memory of the chip card. This handheld unit has also a wireless interface and can communicate with a central server to check the current status of his or her contract and areas of admission or restriction in the facility. It can also be used for cross border control.

Labcal's new rugged mobile reader is algorithm agnostic and can be used with existing AFIS systems. Moreover, the Be.U Mobile performs 1:1 matching with an ID document, contact or contactless card and 1:N matching by storing the fingerprint templates and the credentials in the reader or on a server. The reader communicates wirelessly with the server via Wi-Fi, GSM or CDMA. The Be.U Mobile is also available with an embedded bar code scanner which allows 1D and 2D bar code decoding.

In these remote ID verification applications, the mobile handheld readers are held by access control guards, law enforcement personnel & police, and not by the citizen nor by the employee. The handheld readers are only used to check the credentials of the individual. The contactless smart card carried by the person in question is not an integral part of the handheld reader. The individual is in no position to authorize a transaction using the biometric identifier in the handheld, nor can the individual download e-money, value or content from an Internet-connected PC to the contactless smart card. In short, the handheld readers with multiple interfaces for identification verification and point-of-sale are not pocket size devices, nor do they allow the consumer, citizen or employee to have control over identification, authentication, memory storage and "pay-as-you-go" applications.

Pay-By-Touch

"Pay-By-Touch" technology allows consumers the option of paying for groceries using a finger scan linked to their bank account. The "Pay-By-Touch" system scans customers' fingerprints at the point of sale terminal and links the image with an electronic wallet which holds financial and loyalty program data, eliminating the need to carry cards, cash or a check book.

Vehicle Immobilizers

Most vehicles today have an electronic immobilizer for protecting a vehicle against unauthorized use. In such devices, the inductive key/steering-column lock communication channel constitutes a very short-range radio transmission link operating at around 125 KHz (low frequency) which deactivates the immobilizing function when the electronic key is inserted into the steering-column lock. The ensuing check of a use authorization code stored in the key transponder confirms that the key is the one authorizing the use of the vehicle. The communication is between an RFID reader mounted in the steering-column lock and the vehicle key with transponder constituting the electronic immobilizer, moreover with the additional function of remote control. The transponder device is often packaged in a glass tube or plastic brick for integration in the vehicle key housing.

Contact Interfaces

As used herein, "contact interfaces" (or "mechanical interface") refers to mechanical (wired) connections between one device and another, such as via a cable or inserting a module into a socket. The following are examples of contact interfaces and/or devices that typically connect via a contact interface.

USB Short for "Universal Serial Bus". USB is a serial bus standard (standardized communications protocol) that enables data exchange between electronic devices. USB supports data transfer rates of up to 12 Mbps (megabits per second). A single USB port can be used to connect up to 127 peripheral devices, such as mice, modems, and keyboards. USB also supports plug-and-play installation and "hot plugging". USB is expected to completely replace serial and parallel ports. Hi-Speed USB (USB 2.0) similar to FireWire technology, supports data rates up to 480 Mbps.

Ethernet A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards. A newer version of Ethernet, called 100Base-T (or Fast Ethernet), supports data transfer rates of 100 Mbps. And the newest version, Gigabit Ethernet supports data rates of 1 gigabit (1,000 megabits) per second.

IEEE 1394 IEEE 1394 (also known as FireWire® and iLINK™) is a high-bandwidth isochronous (real-time) interface for computers, peripherals, and consumer electronics products such as camcorders, VCRs, printers, PCs, TVs, and digital cameras. With IEEE 1394-compatible products and systems, users can transfer video or still images from a camera or camcorder to a printer, PC, or television (TV), with no image degradation.

SD Short for "Secure Digital". SD is a technology standard for providing portable devices with non-volatile memory/storage and peripheral I/O expansion capability. On some devices this standard is implemented in the form of SD memory expansion cards, used to store digital information like applications, databases, photos, text, audio, video or MP3 music files, and an SD/SDIO expansion slot. The SD standard makes it possible to transfer information between devices that support SD expansion cards (e.g. transfer photos between a digital camera and a PDA by exchanging the SD expansion card), assuming both devices support the file format used for the transferred information (e.g. JPEG image file).

SDIO Short for "Secure Digital Input/Output". SDIO is a part of the SD memory specification. It enables I/O (input/output) expansion for add-ons such as serial, modem, camera or GPS (global positioning system) cards. Whereas SD is only used for storage expansion cards, an SDIO capable expansion slot can also support SD expansion cards, while an SD-capable slot may not support an SDIO expansion card.

SIM Short for "Secure Identity Module" or "Subscriber Identification/Identity Module". A SIM card inscribed with a customer's information and designed to be inserted into any mobile telephone. Usually SIM card phones work by GSM technology. The SIM card contains a user's GSM mobile account information.

SIM cards are portable between GSM devices—the user's mobile subscriber information moves to whatever device houses the SIM.

ISO 7816 ISO7816 defines specification of smart card contact interface IC chip and IC card. The main ISO standard relating to smart cards is ISO 7816: "Identification cards: integrated circuit cards with contacts".

Wireless Interfaces

As used herein, "wireless interfaces" refers to ultra-high radio frequency (RF) connections between one device and another, typically over a moderate distance, such as up to 100 meters, and in some cases (such as WiMAX) over long distances such as 50 km. The following are examples of wireless interfaces and/or devices that typically connect via a wireless interface.

Wireless Technology that allows a user to communicate and/or connect to the Internet or mobile phone networks without physical wires. Wi-Fi, Bluetooth®, CDMA and GSM are all examples of wireless technology.

Wi-Fi Short for "Wireless Fidelity". Wireless technology, also known as 802.11b, enables you to access the Internet, to send and receive email, and browse the Web anywhere within range of a Wi-Fi access point, or HotSpot.

Bluetooth A wireless technology developed by Ericsson, Intel, Nokia and Toshiba that specifies how mobile phones, computers and PDAs interconnect with each other, with computers, and with office or home phones. The technology enables data connections between electronic devices in the 2.4 GHz range at 720 Kbps (kilo bits per second) within a 10 meter range. Bluetooth uses low-power radio frequencies to transfer information wirelessly between similarly equipped devices.

UWB is short for "Ultra Wide Band". UWB is a wireless communications technology that transmits data in short pulses which are spread out over a wide swath of spectrum. Because the technology does not use a single frequency, UWB enjoys several potential advantages over single-frequency transmissions. For one, it can transmit data in large bursts because data is moving on several channels at once. Another advantage is that it can share frequencies, which is used by other applications because it transmits only for extremely short periods, which do not last long enough to cause interference with other signals.

WLAN Short for "wireless local-area network". Also referred to as LAWN. A WLAN is a type of local-area network that uses high-frequency radio waves rather than wires for communication between nodes (e.g., between PCs).

IEEE 802.11 The IEEE standard for wireless Local Area Networks (LANs). It uses three different physical layers, 802.11a, 802.11b and 802.11g.

WiMAX short for Worldwide Interoperability for Microwave Access. (IEEE 802.16) WiMAX is a standards-based wireless technology that provides high-throughput broadband connections over long distances, such as several kilometers (up to 50 km with direct line-of-sight, up to 8 km without direct line-of-sight). WiMAX can be used for a number of applications, including "last mile" broadband connections, hotspots and cellular backhaul, and high-speed enterprise connectivity for business.

Contactless Interfaces

As used herein, "contactless interfaces" refers to high radio frequency (RF) connections between one device and another, typically over a very short distance, such as only up to 50 cm. The following are examples of contactless interfaces and/or devices that typically connect via a contactless interface.

ISO 14443 ISO 14443 RFID cards; contactless proximity cards operating at 13.56 MHz with a read/write range of up to 10 cm. ISO 14443 defines the contactless interface smart card technical specification.

ISO 15693 ISO standard for contactless integrated circuits, such as used in RF-ID tags. ISO 15693 RFID cards; contactless vicinity cards operating at 13.56 MHz with a read/write range of up to 100 cm. (ISO 15693 is typically not used for financial transactions because of its relatively long range as compared with ISO 14443.)

NFC Short for "Near Field Communication". NFC is a contactless connectivity technology that enables short-range communication between electronic devices.

If two devices are held close together (for example, a mobile phone and a personal digital assistant), NFC interfaces establish a peer-to-peer protocol, and information such as phone book details can be passed freely between them. NFC devices can be linked to contactless smart cards, and can operate like a contactless smart card, even when powered down. This means that a mobile phone can operate like a transportation card, and enable fare payment and access to the subway. NFC is an open platform technology standardized in ECMA (European Computer Manufacturers Association) 340 as well as ETSI (European Telecommunications Standards Institute) TS 102 190 V 1.1.1 and ISO/IEC 18092. These standards specify the modulation schemes, coding, transfer speeds, and frame format of the RF interface of NFC devices, as well as initialization schemes and conditions required for data collision-control during initialization—for both passive and active modes.

RFID Short for "Radio Frequency Identification". An RFID device interacts, typically at a limited distance, with a "reader", and may be either "passive" (powered by the reader) or "active" (having its own power source, such as a battery).

Wireless Versus Contactless Interfaces

Wireless and Contactless are two types of radio frequency (RF) interfaces. In a most general sense, both are "wireless" in that they do not require wires, and that they use RF. However, in the art to which this invention most nearly pertains, the terms "wireless" and "contactless" have two very different meanings and two very different functionalities.

The wireless interfaces of interest in the present invention are principally WLAN, Zigbee, Bluetooth and UWB. These wireless interfaces operate at a distance of several meters, generally for avoiding "cable spaghetti" for example, Bluetooth for headsets and other computer peripherals. WLAN is typically used for networking several computers in an office.

The contactless interfaces of interest in the present invention are principally RFID contactless interfaces such as ISO 14443, 15693 and NFC. RFID operates at a maximum distance of 100 cm for the purpose of identification in applications such as access control. In a payment (financial transaction) application, the distance is restricted to 10 cm. For example, a contactless RFID smart card protocol according to ISO 14443 can be used for private, secure financial transactions in "real world" applications such as payment at a retailer.

Wireless and contactless use different communications protocols with different capabilities and are typically used for very different purposes. Note, for example, that 100 cm (ISO 15693, an RFID contactless protocol) is considered to be too great a distance to provide appropriate security for (contactless) financial transactions. But 100 cm would not be enough to provide a (wireless) network between office computers! Additionally, generally, contactless technology is primarily passive (having no power source of its own), deriving power to operate from the electromagnetic field generated by a nearby reader. Also, contactless technology, using the smart card protocol, is used for secure identification, authentication and payment. Wireless technologies, on the other hand, generally require their own power source (either batteries, or plugged in) to operate. Contactless is different than wireless; different protocol, different signal characteristics, different utility, different energy requirements, different capabilities, different purposes, different advantages, different limitations.

Further Distinctions between Wireless Interfaces

A distinction has been made between contactless interfaces operating at very short distances (such as only up to 10 cm, 50 cm or 100 cm) such as for secure financial transactions, and wireless interfaces operating at moderate distance, such as up to 100 m. Further distinctions between wireless interfaces may be made as follows.

802.11 (Wi-Fi) typically has a range of up to 100 meters, and is typically intended for connectivity to an Internet-capable appliance at a hot-spot. Wi-Fi bandwidth is specified at up to 54 Mbps (802.11 a—5.0 GHz or 802.11 b/g—2.4 GHz).

Bluetooth typically has a range of up to 10 meters, and is typically intended for private/personal communications such as connecting a user's mobile phone with his computer, or with a Bluetooth headset. Bluetooth bandwidth is specified at 720 Kbps.

UWB short for ultra wideband. UWB is a signaling technique using very short pulses to achieve very high transfer speeds. UWB it is not limited to wireless communication, UWB can also use mains-wiring, coaxial cable or twisted-pair cables to communicate. In a wireless mode, UWB may be similar in range to Bluetooth (typically up to 10 meters), but with a much greater bandwidth. Theoretically, WAN can achieve transfer speeds of up to 1 Gbit/s, versus only up to 3 Mbps for Bluetooth.

WAN short for wireless area network. Using a WAN connection such as 802.11, a WAN has a range of up to approximately 100 meters.

PAN short for private area network. Using a wireless connection such as Bluetooth, a PAN has a range of only several meters, such as up to 10 meters.

WiMAX short for Worldwide Interoperability for Microwave Access. (IEEE 802.16) WiMAX is a standards-based wireless technology that provides high-throughput broadband connections over long distances, such as several kilometers (up to 50 km with direct line-of-sight, up to 8km without direct line-of-sight). WiMAX can be used for a number of applications, including "last mile" broadband connections, hotspots and cellular backhaul, and high-speed enterprise connectivity for business.

Therefore, a distinction can be made within the definition of wireless (short distances, such as up to 10 meters) between wireless connections for a private area network (PAN) operating at close range of only several meters (and ensuring a reasonable level of privacy), and wireless connections for a wireless area network (WAN) operating at a medium/moderate range of up to 100 meters to provide public access to the Internet, at hot spots, or to set up a wireless LAN within an office environment.

Thus, for purposes of this disclosure there are identified (and defined) 4 different "levels" (or types) of communication interfaces using radio frequency (RF) for transferring data between compatible devices, as follows:

"contactless", for very short distances, up to 100 cm (less than one meter), such as for performing secure applications such as access control, or financial transactions. (When carrying a smart card, a user needs to feel confident that the contents of the card cannot be snooped or skimmed from a nearby stranger wielding a laptop.) Within contactless, a further distinction can be made between extremely short distances (such as ISO 14443 operating at up to 10 cm distance, and useful for secure financial transactions) and moderately short distances (such as ISO 15693 having a read/write range of up to 100 cm, and useful for RFID used to collect tolls electronically).

"PAN wireless", effective at short distances, up to several meters (such as 10 meters), for providing a personal network, generally for a single user (telephone, computer, Bluetooth headset, computer peripherals), and providing a small measure of privacy based on the limited range of the signal. Also, Infrared (optical transmission), Zigbee, Bluetooth and UWB are used in private area networks.

"WAN wireless", effective at moderate distances, such as up to 100 meters, such as for networking computers in an office environment.

"WiMax wireless", effective at long distances, such as up to 50 kilometers, for providing broadband access to the public (simultaneously to many users), which can hardly be considered to be private, without accompanying encryption of data/signal packets.

Glossary & Definitions

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

ADSL

Asymmetric Digital Subscriber Line (ADSL) is a form of DSL, a data communications technology that enables faster data transmission over copper telephone lines than a conventional modem can provide. ADSL has the distinguishing characteristic that the data can flow faster in one direction than the other, i.e., asymmetrically. Providers usually market ADSL as a service for people to connect to the Internet in a relatively passive mode: able to use the higher speed direction for the "download" from the Internet but not needing to run servers that would require bandwidth in the other direction.

There are both technical and marketing reasons why ADSL is in many places the most common type offered to home users. On the technical side, there is likely to be more crosstalk from other circuits at the DSLAM end (where the wires from many local loops are close together) than at the customer premises. Thus the upload signal is weakest at the noisiest part of the local loop, while the download signal is strongest at the noisiest part of the local loop. It therefore makes technical sense to have the DSLAM transmit at a higher bit rate than does the modem on the customer end. Since the typical home user in fact does prefer a higher download speed, the telcos chose to make a virtue out of necessity, hence ADSL.

For conventional ADSL, downstream rates start at 256 Kbits/s and typically reach 8 Mbits/s within 1.5 km (5000 ft) of the DSLAM equipped central office or remote terminal. Upstream rates start at 64 kbit/s and typically reach 256 kbit/s but can go as high as 1024 Kbit/s. The name ADSL Lite is sometimes used for the slower versions. Note that distances are only approximations. Signal attenuation and Signal to Noise Ratio (SNR) are defining characteristics, and can vary completely independently of distance (e.g. non-copper cabling, cable diameter). Real world performance is also dependent on the line impedance, which can change dynamically either dependent on weather conditions (very common for old overhead lines) or on the number and quality of joints or junctions in a particular cable length.

A newer variant called ADSL2 provides higher downstream rates of up to 12 Mbit/s for spans of less than 2.5 kilometers (8000 feet). Higher symbol rates and more advanced noise shaping are responsible for these increased speeds. ADSL2+, also referred to as ITU G.992,5, boosts these rates to up to 24 Mbit/s for spans of less than 1.5 kilometers (5000 feet). ADSL2+ also offers seamless bonding options, allowing lines with higher attenuation or lower signal to noise (SNR) ratios to be bonded together to achieve theoretically the sum total of the number of lines (i.e. up to 50 Mbit/s for two lines, etc), as well as options in power management and seamless rate adaptation—changing the data rate used without requiring to resynchronize.

Because of the relatively low data-rate (compared to optical backbone networks) ATM is an appropriate technology for multiplexing time-critical data such as digital voice with less time-critical data such as web traffic; ATM runs widely over ADSL technology to ensure that this remains a possibility.

ADSL service providers may offer either static or dynamic IP addressing. Static addressing is preferable for people who may wish to connect to their office via a virtual private network, for some Internet gaming, and for those wishing to use ADSL to host a Web server.

Access Point (AP)

In computer networking, a wireless access point (WAP or AP) is a device that "connects" wireless communication devices together to create a wireless network. The WAP usually connects to a wired network, and can relay data between wireless devices and wired devices. Several WAPs can link together to form a larger network that allows "roaming". (In contrast, a network where the client devices manage themselves—without the need for any access points—becomes an ad-hoc network)

One IEEE 802.11 WAP can typically communicate with 30 client systems located within a radius of 100 m. However, communication range can vary a lot, depending on such variables as indoor or outdoor placement, height above ground, nearby obstructions, type of antenna, the current weather, operating radio frequency, and the power output of devices. Network designers can extend the range of WAPs through the use of repeaters and reflectors, which can bounce or amplify radio signals that ordinarily would go un-received. In experimental conditions, wireless networking has operated over distances of several kilometers.

A typical corporate use of a WAP involves attaching it to a wired network, and then providing wireless client adapters for users who need them. Within the range of the WAP, the wireless end-user has a full network connection with the benefit of mobility. In this instance, the WAP functions as a gateway for clients to access the wired network. Another use involves bridging two wired networks in conditions inappropriate for cable: for example, a manufacturer can wirelessly connect a remote warehouse's wired network with a separate (though with inline of sight) office's wired network.

Authentication

One familiar example of authentication is in access control. A computer system supposed to be used only by those authorized must attempt to detect and exclude the unauthorized. Access to it is therefore usually controlled by insisting on an authentication procedure to establish with some established degree of confidence the identity of the user, hence granting those privileges as may be authorized to that identity.

The methods by which a human can authenticate themselves are generally classified into three cases:

Something about the user is (e.g., fingerprint or retinal pattern, DNA sequence (there are assorted definitions of what is sufficient), voice pattern (again several definitions), signature recognition or other biometric identifier)

Something the user has (e.g., ID card, security token, software token or cell phone)

Something the user knows (e.g., a password, a pass phrase or a personal identification number (PIN))

Sometimes a combination of methods is used, e.g., a bank card and a PIN, in which case the term "two factor authentication" is used.

In a computer data context, cryptographic methods have been developed (digital signature and challenge-response authentication) which are currently not spoofable if (and only if) the originator's key has not been compromised.

Public key cryptography is a form of cryptography which generally allows users to communicate securely without having prior access to a shared secret key, by using a pair of cryptographic keys, designated as public key and private key, which are related mathematically.

The term asymmetric key cryptography is a synonym for public key cryptography. In public key cryptography, the private key is generally kept secret, while the public key may be widely distributed. In a sense, one key "locks" a lock; while the other is required to unlock it. It should not be possible to deduce the private key of a pair given the public key.

There are many forms of public key cryptography, including:

Public key encryption—keeping a message secret from anyone that does not possess a specific private key.

Public key digital signature—allowing anyone to verify that a message was created with a specific private key.

Key agreement—generally, allowing two parties that may not initially share a secret key to agree on one.

Typically, public key techniques are much more computationally intensive than purely symmetric algorithms, but the judicious use of these techniques enables a wide variety of applications.

Bits Per Second (bps)

A measurement of the speed at which data is sent over transmission lines. A bit is the smallest unit of information on a computer. See also: bytes per second (BPS).

Bit Rate

The average number of bits that one second of audio data will consume. Standard MP3 bit rates are 64 kbps (kilobits per second), 96 kbps, 128 kbps, and 160 kbps. The higher the bit rate, the better the sound quality. MP3 files at 128 kbps are considered to be "CD-quality".

Bluetooth

Bluetooth wireless technology supports ad hoc networking, enables devices from many different manufacturers to pair with each other and establishes secure connections "on the fly". It is good at real-time data in synchronous connected oriented mode, but requires relatively high power, so unsuitable for extremely small battery-powered applications.

BPS

Short for bytes per second. BPS (upper case) is a rate of data transfer, not to be confused with bits per second (bps, lower case). A byte is a number of bits that are usually treated as a unit. Bytes of eight bits usually represent either one letter or two numerals.

Challenge/Response

A common authentication technique whereby an individual is prompted (the challenge) to provide some private information (the response). Most security systems that rely on smart cards are based on challenge-response. A user is given a code (the challenge) which he or she enters into the smart card. The smart card then displays a new code (the response) that the user can present to log in.

CBR

Short for constant bit rate. CBR is a type of encoding that maintains a fixed bit rate throughout a file, so that data is sent in a steady stream. But because more complex passages may be encoded with fewer than necessary bits, and relatively simple passages may be encoded with more bits than are necessary, CBR can potentially result in lower-quality sound. See also: variable bit rate (VBR).

Data Transmission Rates
- Zigbee devices have a radio bit rate of 250 kbps as specified by IEEE 802.15.4
- Near Field Communication (NFC) has a data exchange speed up to 424 kbps
- Bluetooth 2.0 devices operate at data rates below 3 megabits per second
- WiFi can deliver data rates of up to 54 megabits per second using a shared, unlicensed radio band at 2.4 GHz
- Ultra-Wideband (UWB) technology supports up to 480 megabits per second with a roadmap to 1 gigabit per second over short distance

DHCP

In the context of computer networking, Dynamic Host Configuration Protocol (DHCP) is a client-server networking protocol. A DHCP server provides configuration parameters specific to the DHCP client host requesting, generally, information required by the client host to participate on an IP network. DHCP also provides a mechanism for allocation of IP addresses to client hosts.

DNS

The Domain Name System or DNS is a system that stores information associated with domain names in a distributed database on networks, such as the Internet. The domain name system associates many types of information with domain names, but most importantly, it provides the IP address associated with the domain name. It also lists mail exchange servers accepting e-mail for each domain.

DNS is useful for several reasons. Most well known, the DNS makes it possible to attach hard-to-remember IP addresses (such as 207.142.131.206) to easy-to-remember domain names (such as "wikipedia.org.") Humans take advantage of this when they recite URLs and e-mail addresses. Less recognized, the domain name system makes it possible for people to assign authoritative names, without needing to communicate with a central registrar each time.

Dongle

A mechanical device used by software developers to prevent unlicensed use of their product. Typically, a Dongle is a small connector plug, supplied with the original software package, which fits into a socket on a PC—usually a parallel port, also known generally as the LPT1 Printer port. Without the Dongle present, the software will not run. Some older Dongles act as a terminator, effectively blocking the port for any other use, but later versions have a pass-through function, allowing a printer to be connected at the same time. Even though the PC can still communicate with the printer, there have been problems with more recent printers which use active two-way communications with the PC to notify printing status, ink levels, etc.

EMV (Europay, MasterCard, Visa) Standard

EMV is the industry abbreviation for the consortium of three companies who created a joint working group in 1994 (Europay International, MasterCard International, Visa International) jointly sponsoring the global standard for electronic financial transactions. It also refers to the technical specifications produced by that consortium and adopted by all three companies designed to ensure the global interoperability of chip cards, chip terminals, financial messages and related services.

ExpressCard—PC Card

A PC Card is a card that goes into a personal computer and allows it to take on extra functions. A revision of the PC Card is known as CardBus. The PCMCIA is also developing a new notebook peripheral specification called Newcard or ExpressCard.

The first PC cards (PCMCIA) were Type I, and supported actual Memory Cards (e.g. ATA Type I Flash Memory Cards), such as DRAM or Flash memories. Type II cards added I/O support in addition to memory applications, and type III expanded on this. The ports role as I/O for various devices has largely superseded its role as a Memory Card, but this role did spawn a generation of flash memory cards that set out to improve on the size and features of ATA Type I cards (CompactFlash, MiniCard and SSFDC (Smartmedia)).

Fingerprint Authentication

This refers to the automated method of verifying a match between two human fingerprints. Fingerprints are one of many forms of biometrics used to identify an individual and verify their identity. There are two major classes of algorithms (minutia and pattern) and four sensor designs (optical, ultrasonic, passive capacitance, and active capacitance).

A fingerprint sensor is an electronic device used to capture a digital image of the fingerprint pattern. The captured image is called a live scan. This live scan is digitally processes to create a biometric template (a collection of extracted features) which is stored and used for matching.

Optical fingerprint imaging involves capturing a digital image of the print using visible light. This type of sensor is, in essence, a specialized digital camera. The top layer of the sensor, where the finger is placed, is known as the touch surface. Beneath this layer is a light-emitting phosphor layer which illuminates the surface of the finger. The light reflected from the finger passes through the phosphor layer to an array of solid state pixels (a charge coupled device) which captures a visual image of the fingerprint. A scratched or dirty touch surface can cause a bad image of the fingerprint. A disadvantage of this type of sensor is the fact that the imaging capabilities are affected by the quality of skin on the finger. For instance, a dirty or marked finger is difficult to image properly. Also, it is possible for an individual to erode the outer layer of skin on the fingertips to the point where the fingerprint is no longer visible. However, unlike capacitive sensors, this sensor technology is not susceptible to electrostatic discharge damage.

Ultrasonic sensors make use of the principles of medical ultrasonography in order to create visual images of the fingerprint. Unlike optical imaging, ultrasonic sensors use very high frequency sound waves to penetrate the epidermal layer of skin. The sound waves are generated using piezoelectric transducers and reflected energy is also measured using piezoelectric materials. Since the dermal skin layer exhibits the same characteristic pattern of the fingerprint, the reflected wave measurements can be used to form an image of the fingerprint. This eliminates the need for clean, undamaged epidermal skin and a clean sensing surface.

Capacitance sensors utilize the principles associated with capacitance in order to form fingerprint images. The two equations used in this type of imaging are:

$$C = \frac{Q}{V}$$

$$C = \epsilon_0 \epsilon_r \frac{A}{d}$$

where
C is the capacitance in farads
Q is the charge in coulombs
V is the potential in volts
$\epsilon_0$ is the permittivity of free space, measured in farad per meter
$\epsilon_r$ is the dielectric constant of the insulator used
A is the area of each plane electrode, measured in square meters
d is the separation between the electrodes, measured in meters In this method of imaging, the sensor array pixels each act as one plate of a parallel-plate capacitor, the dermal layer (which is electrically conductive) acts as the other plate, and the non-conductive epidermal layer acts as a dielectric.

A passive capacitance sensor uses the principle outlined above to form an image of the fingerprint patterns on the dermal layer of skin. Each sensor pixel is used to measure the capacitance at that point of the array. The capacitance varies between the ridges and valleys of the fingerprint due to the fact that the volume between the dermal layer and sensing element in valleys contains an air gap. The dielectric constant of the epidermis and the area of the sensing element are known values. The measured capacitance values are then used to distinguish between fingerprint ridges and valleys.

Active capacitance sensors use a charging cycle to apply a voltage to the skin before measurement takes place. The application of voltage charges the effective capacitor. The electric field between the finger and sensor follows the pattern of the ridges in the dermal skin layer. On the discharge cycle, the voltage across the dermal layer and sensing element is compared against a reference voltage in order to calculate the capacitance. The distance values are then calculated mathematically, using the above equations, and used to form an image of the fingerprint. Active capacitance sensors measure the ridge patterns of the dermal layer like the ultrasonic method. Again, this eliminates the need for clean, undamaged epidermal skin and a clean sensing surface.

Algorithms

Matching algorithms are used to compare previously stored templates of fingerprints against candidate fingerprints for authentication purposes. In order to do this either the original image must be directly compared with the candidate image or certain features must be compared.

Pattern-based (or Image-based) algorithms compare the basic fingerprint patterns (arch, whorl, and loop) between a previously stored template and a candidate fingerprint. This requires that the images be aligned in the same orientation. To do this, the algorithm finds a central point in the fingerprint image and centers on that. In a pattern-based algorithm, the template contains the type, size, and orientation of patterns within the aligned fingerprint image. The candidate fingerprint image is graphically compared with the template to determine the degree to which they match.

Minutia based algorithms compare several minutia points (ridge ending, bifurcation, and short ridge) extracted from the original image stored in a template with those extracted from a candidate fingerprint. Similar to the pattern-based algorithm, the minutia-based algorithm must align a fingerprint image before extracting feature points. This alignment must be performed so that there is a frame of reference. For each minutia point, a vector is stored into the template in the form:

$$m_i = (\text{type}, x_i, y_i, \theta_i, W)$$

where
$m_i$ is the minutia vector
type is the type of feature (ridge ending, bifurcation, short ridge)
$x_i$ is the x-coordinate of the location
$y_i$ is the y-coordinate of the location
$\theta_i$ is the angle of orientation of the minutia
W is a weight based on the quality of the image at that location It is important to note that an actual image of the print is not stored as a template under this scheme. Before the matching process begins, the candidate image must be aligned with the template coordinates and rotation. Features from the candidate image are then extracted and compared with the information in the template. Depending on the size of the input image, there can be 10-100 minutia points in a template. A successful match typically only requires 7-20 points to match between the two fingerprints.

GPRS

Short for General Packet Radio Service, a standard for wireless communications which runs at speeds up to 115 kilobits per second, compared with current GSM (Global System for Mobile Communications) systems' 9.6 kilobits. GPRS, which supports a wide range of bandwidths, is an efficient use of limited bandwidth and is particularly suited for sending and receiving small bursts of data, such as e-mail and Web browsing, as well as large volumes of data.

Hertz (Hz)

The frequency of electrical vibrations (cycles) per second. One Hz is equal to one cycle per second.

Hotspot

A specific geographic location in which an access point provides public wireless broadband network services to mobile visitors through a WLAN. Hotspots are often located in heavily populated places such as airports, train stations, libraries, marinas, conventions centers and hotels. Hotspots typically have a short range of access.

Internet

A global network connecting millions of computers for the exchange of data, news and opinions. Unlike online services, which are centrally controlled, the Internet is decentralized by design. Each Internet computer, called a host, is independent. Its operators can choose which Internet services to use and which local services to make available to the global Internet community. Remarkably, this anarchy by design works exceedingly well. There are a variety of ways to access the Internet. Most online services, such as America Online, offer access to some Internet services. It is also possible to gain access through a commercial Internet Service Provider (ISP).

ISO 15693

Is an ISO standard for "Vicinity Cards", i.e. cards which can be read from a greater distance as compared to Proximity cards. ISO 15693 systems operate at the 13.56 MHz frequency, and offer maximum read distance of 1-1.5 meters. An example of this being the Radio Identification tags (RFID) used to collect toll electronically these days. As the vicinity cards have to operate at a greater distance, the necessary magnetic field is less (0.15 to 5 A/m) than that for a proximity card (1.5 to 7.5 A/m).

ITSEC

Information Technology Security Evaluation Criteria

LAN

Short for "Local Area Network". A computer network that spans a relatively small area. Most LANs are confined to a single building or group of buildings. However, one LAN can be connected to other LANs over any distance via telephone lines and radio waves. A system of LANs connected in this way is called a wide-area network (WAN).

Multiple Input Multiple Output

MIMO stands for multiple-input multiple-output, an abstract mathematical model for some systems. In radio communications if multiple antennas are employed, the MIMO model naturally arises. MIMO exploits phenomena such as multi-path propagation to increase throughput, or reduce bit error rates, rather than attempting to eliminate effects of multi-path. MIMO can also be used in conjunction with OFDM and it will be part of the IEEE 802.11n High-Throughput standard, which is expected to be finalized in early 2007.

Near Field Communication

Near Field Communications (NFC) technology addresses the need to simplify and expand the consumer's connectivity, content and commerce experiences in consumer electronics, digital media and personal wireless communications.

Specifications:
  Works by magnetic field induction and operates within the globally available and unregulated 13.56 MHz frequency band
  Maximum working distance: 1.5-2 meters
  Speed: 106 kbit/s, 212 kbit/s or 424 kbit/s
  Passive Communication Mode: The Initiator device provides a carrier field and the target device answers by modulating existing field. In this mode, the Target device may draw its operating power from the Initiator-provided electromagnetic field.
  Active Communication Mode: Both, Initiator and Target device communicate by generating their own field. In this mode, both devices typically need to have a power supply.
NFC can be used to configure and initiate other wireless network connections such as Bluetooth or WiFi. NFC is extremely low power, and one end can operate parasitically, that is, without battery and does not require complicated pairing, simply touch and go. NFC technology and enhanced NFC (ISO 14443 A, B, FeliCa, ISO 15693) offers the capability to communicate either like a contactless reader or transponder.

NTP

Short for Network Time Protocol, an Internet standard protocol (built on top of TCP/IP) that assures accurate synchronization to the millisecond of computer clock times in a network of computers. Based on UTC, NTP synchronizes client workstation clocks to the U.S. Naval Observatory Master Clocks in Washington, D.C. and Colorado Springs Colo. Running as a continuous background client program on a computer, NTP sends periodic time requests to servers, obtaining server time stamps and using them to adjust the client's clock.

OFDM

Short for Orthogonal Frequency Division Multiplexing, an FDM modulation technique for transmitting large amounts of digital data over a radio wave. OFDM works by splitting the radio signal into multiple smaller sub-signals that are then transmitted simultaneously at different frequencies to the receiver. OFDM reduces the amount of crosstalk in signal transmissions.802.11a WLAN, 802.16 and WiMAX technologies use OFDM.

PC

Short for "Personal Computer". A PC is a single-user computer based on a microprocessor. In addition to the microprocessor, a personal computer has a keyboard for entering data, a monitor for displaying information, and a storage device for saving data.

Router

A router is a computer networking device that forwards data packets across an Internet work toward their destinations, through a process known as routing. Routing occurs at layer 3 (the Network layer) of the OSI seven-layer model.

In non-technical terms, a router acts as a junction between two networks to transfer data packets among them. A router is essentially different from a switch that connects devices to form a Local Area Network (LAN). One easy illustration for the different functions of routers and switches is to think of switches as neighborhood streets, and the router as the intersections with the street signs. Each house on the street has an address within a range on the block. In the same way, a switch connects various devices each with their own IP address(es) on a LAN. However, the switch knows nothing about IP addresses except its own management address.

Routers connect networks together the way that onramps or major intersections connect streets to both highways and freeways, etc. The street signs at the intersection (routing table) show which way the packets need to flow.

Routers are also now being implemented as Internet gateways, primarily for small networks like those used in homes and small offices. This application is mainly where the Internet connection is an always-on broadband connection like cable modem or DSL. These are routers in the true sense because they join two networks together—the WAN and the LAN—and have a routing table. Often these small routers support the RIP protocol, although in a home application the routing function does not serve much purpose since there are only two ways to go—the WAN and the LAN. In addition, these routers typically provide DHCP, NAT, DMZ and Firewall services. Sometimes these routers can provide content filtering and VPN. Typically they are used in conjunction with either a cable modem or DSL modem, but that function can also be built-in.

Single Sign-on

Single sign-on (SSO) is a specialized form of software authentication that enables a user to authenticate once and gain access to the resources of multiple software systems.

There are at least five major types of SSO or reduced sign-on systems in common use:

- Enterprise single sign-on (E-SSO), also called legacy single sign-on, after primary user authentication, intercepts login prompts presented by secondary applications, and automatically fills in fields such as a login ID or password. E-SSO systems allow for interoperability with applications that are unable to externalize user authentication, essentially through "screen scraping"
- Web single sign-on (Web-SSO), also called Web access management (Web-AM) works strictly with applications and resources accessed with a web browser. Access to web resources is intercepted, either using a web proxy server or by installing a component on each targeted web server. Unauthenticated users who attempt to access a resource are diverted to an authentication service, and returned only after a successful sign-on. Cookies are most often used to track user authentication state, and the Web-SSO infrastructure extracts user identification information from these cookies, passing it into each web resource.
- Kerberos is a popular mechanism for applications to externalize authentication entirely.

Users sign into the Kerberos server, and are issued a ticket, which their client software presents to servers that they attempt to access.

- Federation is a new approach, also for web applications, which uses standards-based protocols to enable one application to assert the identity of a user to another, thereby avoiding the need for redundant authentication. Standards to support federation include SAML and WS-Security.
- Light-Weight Identity and Open ID, under the YADIS umbrella, offer distributed and decentralized SSO, where identity is tied to an easily-processed URL which can be verified by any server using one of the participating protocols.

Software

Computer instructions or data. Anything that can be stored electronically is software. Software is typically stored in binary form (ones and zeros, represented by two distinctive states) on a storage medium, such as a floppy disc, hard drive, memory device, or the like, all of which may generally and broadly be referred to as "hardware". The apparatus or system or device which responds to software instructions or manipulates software data may generally and broadly be referred to as a "computer". Software is sometimes abbreviated as "S/W". Software is often divided into the following two categories:

- systems software: includes the operating system and all the utilities that enable the computer to function.
- applications software: includes programs that do real work for users. For example, word processors, spreadsheets, and database management systems fall under the category of applications software.

TCP/IP

Short for "Transmission Control Protocol/Internet Protocol". TCP/IP has become the basic protocol that defines how information is exchanged over the Internet. IP software sets the rules for data transfer over a network, while TCP software ensures the safe and reliable transfer of data. The abbreviation TCP/IP is commonly used to represent the whole suite of internetworking software.

T-Money

T-money is a passive contactless transportation card or fob used in public transportation in Seoul Korea. The "T" in T-Money stands for "top, touch, total, travel, and technology". T-Money can also be used to pay admission at amusement parks or spectator facilities, as well as for pay parking fees, and other charges. Mileage points accumulated can be transferred to the T-Money card. T-Money services come with some credit cards. They can be used without pre-charging the cards. The ticket cost for using public transportation is charged to the holder's credit card bill, just like any purchases. Mobile Phone T-Money services come with some mobile phones. Users can charge the amounts online using their mobile phone and will be charged through the bank account that the user registered when they bought the mobile phone.

UTC

Coordinated Universal Time (UTC) is a time scale that couples Greenwich Mean Time, which is based solely on the Earth's inconsistent rotation rate, with highly accurate atomic time. When atomic time and Earth time approach a one second difference, a leap second is calculated into UTC. UTC was devised on Jan. 1, 1972 and is coordinated in Paris by the International Bureau of Weights and Measures. UTC, like Greenwich Mean Time, is set at 0 degrees longitude on the prime meridian.

UWB

Ultra wideband usually refers to a radio communications technique based on transmitting very-short-duration pulses, often of duration of only nanoseconds or less, whereby the occupied bandwidth goes to very large values. This allows it to deliver data rates in excess of 100 Mbit/s, while using a small amount of power and operating in the same bands as existing communications without producing significant interference. However it is not limited to wireless communication, UWB can also use mains-wiring, coaxial cable or twisted-pair cables to communicate - with potential to deliver data faster than 1 gigabit per second.

There are a number of competing standards which makes universally compatible UWB products problematic in the short-term. Recently, however, both Wireless USB and 1394 have standardized on the WiMedia (MB-ODFM) radio. In addition, Bluetooth stakeholders have expressed an interest in using UWB at the core of their next-generation standards. UWB signaling is being considered a potential candidate for the alternate physical layer protocols for the high data rate IEEE 802.15.3a standard as well as the low data rate IEEE802.15a "Zigbee" wireless personal area network (WPAN) standards. The IEEE 802.15.4a standard aims at providing a physical layer wireless communication protocol with ranging capabilities for low-power applications such as sensor networks. The narrow duration of the UWB pulses enable in achieving stringent (<1 m) ranging requirements.

Validation

Validation is the process of checking if something satisfies a certain criterion.

VBR

Short for variable bit rate. VBR specifies the sound quality level but allows the bit rate to fluctuate. During complex passages, VBR uses a higher-than-average bit rate but during simple passages uses a lower-than-average bit rate. The result is that VBR produces an overall higher, more consistent sound quality compared to CBR (constant bit rate) at similar bit rates. VBR allows users to specify a throughput capacity (i.e., a peak rate) and a sustained rate but data is not sent evenly. VBR is often used when transmitting compressed packetized voice and video data, such as videoconferencing.

WHQL

Short for Windows Hardware Quality Labs, a Microsoft facility that tests and certifies third-party hardware and driver products for compatibility with Windows operating systems. Products that meet the compatibility requirements are then allowed to display Windows logos on product packaging, advertising and collateral and other marketing materials, indicating that the product has met the standards of Microsoft and that the product has been designed to work with the Windows operating systems. Once a product has received the WHQL logo it is listed on the Microsoft Hardware Compatibility List.

WiFi, Wireless LAN or IEEE 802.11

Short for wireless fidelity and is meant to be used generically when referring to any type of 802.11 network, whether 802.11b, 802.11a, dual band, etc. The term is promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (for example, 2.4 GHz for 802.11b or 11g, 5 GHz for 802.11a) will work with any other, even if not "Wi-Fi Certified."

Formerly, the term "Wi-Fi" was used only in place of the 2.4 GHz 802.11b standard, in the same way that "Ethernet" is used in place of IEEE 802.3. The Alliance expanded the generic use of the term in an attempt to stop confusion about wireless LAN interoperability.

Wi-Fi is poor at real-time data, until 802.11e is deployed. It requires relatively high power, so it is generally unsuitable for small battery-powered applications.

WiMAX

WiMAX, an acronym that stands for Worldwide Interoperability for Microwave Access, is a certification mark for products that pass conformity and interoperability tests for the IEEE 802.16 standards. IEEE 802.16 is working group number 16 of IEEE 802, specializing in point-to-multipoint broadband wireless access.

Early products are likely to be aimed at network service providers and businesses, not consumers. It has the potential to enable millions more to have wireless Internet connectivity, cheaply and easily. Proponents say that WiMAX wireless coverage will be measured in square kilometers while that of Wi-Fi is measured in square meters. According to WiMAX promoters, each WiMAX node or "base station" would enable high-speed Internet connectivity for homes and businesses in a radius of up to 50 km (31 miles); these base stations will eventually cover an entire metropolitan area, making that area into a WMAN and allowing true wireless mobility within it, as opposed to hot-spot hopping required by Wi-Fi. Its proponents are hoping that the technology will eventually be used in notebook computers and PDAs. True roaming cell-like wireless broadband, however, will require 802.16e.

It should be noted that claims of 50 km (31 miles) range, especially claims that such distances can be achieved without line of sight, represent, at best, a theoretical maximum under ideal circumstances. The technical merit of these claims has yet to be tested in the real world.

The original WiMAX standard, IEEE 802.16, specifies WiMAX in the 10 to 66 GHz range. 802.16a added support for the 2 to 11 GHz range, of which many parts are already unlicensed internationally and only few still require domestic licenses. Most business interest will probably be in the 802.16a standard, as opposed to the higher frequencies. The WiMAX specification improves upon many of the limitations of the Wi-Fi standard by providing increased bandwidth and stronger encryption.

It also aims to provide connectivity to network endpoints without direct line of sight in some circumstances. The details of performance under near-line of sight (NLOS) circumstances are unclear, as they have yet to be demonstrated. It is commonly considered that spectrum under 5-6 GHz is needed to provide reasonable NLOS performance and cost effectiveness for PtM (point to multi-point) deployments. WiMAX makes clever use of multi-path signals but does not defy the laws of physics.

Wireless USB

It is based on WiMedia's ultra-wideband common radio platform, enabling products from the PC, CE and mobile industries to connect using a common interface at up to 480 Mbps at 3 meters and 110 Mbps at 10 meters.

802.11i

IEEE 802.11i is an amendment to the 802.11 standard specifying security mechanisms for wireless networks (see Wi-Fi). The draft standard was ratified on 24 Jun. 2004, and supersedes the previous security specification, Wired Equivalent Privacy (WEP), which was shown to have severe security weaknesses. Wi-Fi Protected Access (WPA) had previously been introduced by the Wi-Fi Alliance as an intermediate solution to WEP insecurities. WPA implemented a subset of 802.11i. The Wi-Fi Alliance refers to their approved, interoperable implementation of the full 802.11i as WPA2. 802.11i makes use of the Advanced Encryption Standard (AES) block cipher; WEP and WPA use the RC4 stream cipher. The 802.11i architecture contains the following components: 802.11X for authentication (entailing the use of EAP and an authentication server), RSN for keeping track of associations, and AES-based CCMP to provide confidentiality, integrity and origin authentication.

802.11n

In January 2004, IEEE announced that it will develop a new standard for wide-area wireless networks. The real speed would be 100 Mbit/s (even 250 Mbit/s in PHY level), and so up to 4-5 times faster than 802.11g, and perhaps 50 times faster than 802.11b. As projected, 802.11n will also offer a better operating distance than current networks. The standardization progress is expected to be completed by the end of 2006. 802.11n builds upon previous 802.11 standards by adding MIMO (multiple-input multiple-output). The additional transmitter and receiver antennas allow for increased data throughput through spatial multiplexing and increased range by exploiting the spatial diversity through coding schemes like Alamouti coding.

802.15.4/ZigBee

The ZigBee specification is a combination of HomeRF Lite and the 802.15.4 specification. The spec operates in the 2.4 GHz (ISM) radio band—the same band as 802.11b standard, Bluetooth, microwaves and some other devices. It is capable of connecting 255 devices per network. The specification supports data transmission rates of up to 250 Kbps at a range of up to 30 meters. ZigBee's technology is slower than 802.11b (11 Mbps) and Bluetooth (1 Mbps), but it consumes significantly less power.

IEEE 802.15.4/ZigBee is intended as a specification for low-powered networks for such uses as wireless monitoring and control of lights, security alarms, motion sensors, thermostats and smoke detectors.

802.15.4/Zigbee is part of the IEEE 802.15 wireless personal area network standard and specifies the media access control (MAC) and physical (PHY) layers. It is a simple (28K byte) packet-based radio protocol aimed at very low-cost, battery-operated widgets and sensors (whose batteries last years, not hours) that can intercommunicate and send low-bandwidth data to a centralized device.

802.15.4/ZigBee networks are slated to run in the unlicensed frequencies, including the 2.4-GHz band as well as the 915 MHz band in the US and 868 MHz in Europe.

16 Gb NAND

In a press release on Sep. $12^{th}$, 2005, Samsung announced that it has developed a 16 Gigabit (Gb) NAND memory device. In the article titled "SAMSUNG Electronics Develops First 16-Gigabit NAND Memory using 50-nm Technology for Sharp Jump in Mobile Storage Capacity", it is stipulated that the new technology is an alternative to mini-HDDs. Development of the 16 Gb NAND flash memory makes it easier to store massive amounts of data on small portable devices. Availability of Samsung's 16 Gb NAND will allow mobile and portable application designers to use memory cards with densities up to 32-Gigabytes (GBs) by combining up to 16 such devices on a single card. A 32 GB density translates into the ability to store either 200 years of an average daily newspaper, 8000 MP3 music files (680 hours) or 20 DVD resolution movies (32 hours of high-resolution video footage) on a mobile device.

Tokens and Token-Related Definitions

Tokens

A security token (or sometimes a hardware token, authentication token or cryptographic token) is a physical device that an authorized user of computer services is given to aid in authentication. Tokens are typically small enough to be carried in a pocket or purse and often are designed to attach to the user's keychain. Some may store cryptographic keys, like a digital signature, or biometric data, like a fingerprint. Some designs feature tamper resistant packaging, other may include small keypads, thus allowing entry of a PIN. Some tokens are very simple, others are complex and have embedded several other technologies. There are many vendors with different technologies. A USB token is a USB memory stick (memory device) with an encryption (cryptographic) engine on it. Tokens are generally used for encryption, or to generate passwords.

Digital Signatures

For tokens to identify the user all tokens must have some kind of number that is unique, not all of these fully qualify as digital signatures according to national laws. Tokens with no on-board keyboard or another user interface can not be used in some signing scenarios, like when confirming a bank transaction based on the bank account number that the funds are to be transferred to.

Single Sign-on Software

Some types of single sign-on solutions, like Enterprise single sign-on, use the token to store software that allows for seamless authentication and password filling.

One-Time Passwords

In short, a one-time password is a password that changes after each login, or changes after a set time interval.

Mathematical Algorithm Type One-Time Passwords

Mathematical algorithm type one-time passwords uses a complex mathematical algorithm to generate a new password based on the previous one, the first time a password is generated the algorithm typically uses a secret shared key. The open source OATH algorithm is standardized, others algorithms are US patented.

CRYPTOCard

CRYPTOCard produce a new one-time password each time its button is pressed. The computer system will accept several forward values in case the button is pressed more than once by accident, or if the client failed to authenticate.

Verisign

Verisign Unified Authentication uses the OATH standard. Verisign Unified Authentication OEM is Aladdin Knowledge Systems.

Time-Synchronized One-Time Passwords

A time-synchronized one-time password is constantly changing given a set time interval, thus to do this some sort of synchronization must exist between the client's token and the authentication server. For disconnected tokens this time-synchronization is done before the token is distributed to the client, other token types do the synchronization when the token is inserted into an input device.

Booleansoft

Booleansoft tokens synchronize with the authentication server when inserted into aninput device like a USB input device or a CD-ROM drive.

RSA Security's SecurID

RSA Security's SecurID displays a number which changes at a set interval; e.g. a time-synchronized one-time password. The client enters the one-time password along with a PIN when authenticating. US patented technology.

Vasco's DigiPass

Vasco's DigiPass series has a small keyboard where the user can enter a PIN, in addition it generates a new one-time password every 36 seconds.

Medical Definitions:

Acquired Immunodeficiency Syndrome

An epidemic disease caused by an infection by human immunodeficiency virus (HIV-1, HIV-2), a retrovirus that causes immune system failure and debilitation and is often accompanied by infections such as tuberculosis. AIDS is spread through direct contact with body fluids.

Acronym: AIDS

Angiogram

A diagnostic procedure done in the X-ray department to visualize blood vessels following introduction of a contrast material into an artery.

Angiographic

Relating to or utilizing angiography.

CAT Scan—Computed Tomography (CT)

A special radiographic technique that uses a computer to assimilate multiple X-ray images into a 2 dimensional cross-sectional image. This can reveal many soft tissue structures not shown by conventional radiography. Scans may also be dynamic in which a movement of a dye is tracked. A special dye material may be injected into the patient's vein prior to the scan to help differentiate abnormal tissue and vasculature. The machine rotates 180 degrees around the patient's body, sending out a pencil-thin X-ray beam at 160 different points. Crystals positioned at the opposite points of the beam pick up and record the absorption rates of the varying thickness of tissue and bone. These data are then relayed to a computer that turns the information into a picture on a screen. Using the same dosage of radiation as that of the conventional X-ray machine, an entire slice of the body is made visible with about 100 times more clarity.

CPR

Cardiopulmonary Resuscitation (CPR) consists of mouth-to-mouth respiration and chest compression. CPR allows oxygenated blood to circulate to vital organs such as the brain and heart. CPR can keep a person alive until more advanced procedures (such as defibrillation—an electric shock to the chest) can treat the cardiac arrest. CPR started by a bystander doubles the likelihood of survival for victims of cardiac arrest.

Dialysis

A medical procedure that uses a machine to filter waste products from the bloodstream. A necessary form of treatment in patients with end-stage renal disease. In most circumstances, kidney dialysis is administered in a fixed schedule of three times per week.

DICOM Standard

The Digital Imaging and Communications in Medicine (DICOM) standard was created by the National Electrical Manufacturers Association (NEMA) to aid the distribution and viewing of medical images, such as CT scans, MRIs, and ultrasound.

ECG—Electrocardiogram

A recording of the electrical activity of the heart on a moving strip of paper. The electrocardiogram detects and records the electrical potential of the heart during contraction.
Acronym: ECG Echocardiography Echocardiography is a diagnostic test, which uses ultrasound waves to make images of the heart chambers, valves and surround structures. It can measure cardiac output and is a sensitive test for inflammation around the heart (pericarditis). It can also be used to detect abnormal anatomy or infections of the heart valves.

Echocardiography, Doppler

Measurement of intra-cardiac blood flow using an m-mode and/or two dimensional (2-d) echocardiogram while simultaneously recording the spectrum of the audible Doppler signal (e.g., velocity, direction, amplitude, intensity, timing) reflected from the moving column of red blood cells.

ERCP—Endoscopic Retrograde Cholangiopancreatography

A diagnostic-therapeutic procedure that involves the X-ray of the pancreatic duct and biliary tree after the selective introduction of a contrast material into the common bile duct and pancreatic duct. In this procedure, a flexible endoscope is passed through the mouth and down into the duodenum. A catheter is then passed through the endoscope and inserted into the pancreatic and bile ducts. Therapeutic measures can often be taken at the time of ERCP to remove stones in the bile ducts or to relieve obstructions of the bile ducts, so that traditional open surgery can be avoided. Acronym: ERCP Hepatitis Viruses Any of the viruses that cause inflammation of the liver.

Holter Monitoring

A test, which measures the heart rhythm (ECG) over a 24-hour period of time while the patient records their symptoms and activities in a diary.

MRI—Magnetic Resonance Imaging

A special imaging technique used to image internal structures of the body, particularly the soft tissues. An MRI image is superior to a normal X-ray image. It uses the influence of a large magnet to polarize hydrogen atoms in the tissues and then monitors the summation of the spinning energies within living cells. These scans may be used for detecting some cancers or for following their progress.

Oncology

The study of diseases that cause cancer.

PACS—Picture Archiving Communication System

A filmless picture archiving communication system used with all imaging modalities including standard X-rays, CT, MRI, Ultrasound, and Nuclear Medicine. It allows images to be distributed electronically and interpreted on computer workstations.

Ultrasound

A type of imaging technique, which uses high-frequency sound waves

Ultrasound Cardiography—Echocardiography

Echocardiography is a diagnostic test, which uses ultrasound waves to make images of the heart chambers, valves and surrounding structures.

BRIEF DESCRIPTION (SUMMARY) OF THE INVENTION

The invention is generally directed to the convergence of RFID reader technology, wireless client interface, flash memory and/or hard disk drive and a mechanical (contact) interface such as USB, to create an apparatus which merges smart card applications with the Internet (TCP/IP).

An RFID reader apparatus (100, 150) is used in combination with a removable, secure contactless smart card fob (116, 166) which is inserted into the housing of the apparatus, giving the apparatus a first layer (or level) of "personality".

The RFID reader apparatus is given a second layer of personality by using a in-built biometric sensor to read a live fingerprint or thumbprint (biometric characteristic) of the user (namely, smart card holder) during an initialization or registration process. The user's biometric characteristics are compressed, stored and electronically signed for reference in the memory of the apparatus. This means that the apparatus becomes unique to the user, as it authenticates the identity of the smart card holder by sensing his or her fingerprint and comparing it with the user's (cardholder's) biometric profile stored in its memory for predefined applications.

The fact that the RFID reader apparatus of the present invention becomes unique to a single user distinguishes the apparatus of the present invention from other devices which may be used by border agents (for example, the Labcal unit described hereinabove) to read fingerprints of many users. In addition, the single user has control over those applications which require fingerprint verification to perform a transaction or an exchange. The apparatus is not for remote identification authentication, but rather it is an interactive device for uploading and downloading e-money, value, content and data to the memory of the reader and/or contactless smart card fob, via its contactless, wireless or optical interface. The biometric identifier can be regarded as a replacement for a PIN (personal identification) number in applications such as physical & logical access, mobile wallet and entry to password protected sites.

The RFID reader apparatus of the present invention may be RFID agnostic, supporting a variety of international standards. The apparatus can incorporate a thumbprint biometric membrane sensor with actuator which can be depressed to power-up the apparatus and to acknowledge a transaction.

Slots may be provided in the apparatus for the insertion of removable color-coded Secure Digital memory (118, 168) and SD I/O devices (117, 167).

The apparatus can generate "One Time Passwords" when in an electromagnetic field, in a wireless hot spot or can synchronize itself with an Internet atomic clock and precisely record all events and transactions with an exact time/date stamp.

As the insertable contactless smart card fob can be personalized with encrypted keys (Login ID & Passwords), the RFID reader apparatus can issue an authorization signal or transmit keys for access to password protected sites via it's contactless or wireless interfaces when the biometric sensor captures a digital image of a live fingerprint which coincides with the template stored in the memory of the reader or contactless chip. As the keys may be updated on a regular basis using the Internet Atomic Clock for synchronization, secure Single Sign-on for a number of websites (specific to the personalized fob) may be achieved.

The contactless interface of the RFID reader apparatus may be in accordance with ISO 14443 & ISO 15693 and/or NFC. The contactless interface typically operates at 13.56 MHz.

The wireless interface of the RFID reader apparatus can be selected from the group; Zigbee, Bluetooth, WLAN 802. 11, UWB, USB wireless and/or any similar interface.

In an embodiment, the RFID reader apparatus (100, 150) comprises:
 a housing;
 a slot for a contact and/or contactless fob (116, 166);
 a USB stick (104) alternately protruding from the housing and retracted within the housing (or removable (162) from the housing; and
 a biometric membrane sensor (110) with actuator (112).
The RFID reader apparatus may further comprise:
 additional slots for receiving SD memory (118, 168), SDIO wireless (117, 167), and the like.

The bringing together of a contact or contactless fob imparts "personality" to the RFID reader apparatus. Also, in the case of a contact fob inserted into the housing, the reader (100, 150) can transform a contact interface to a contactless environment. In the case of a contactless fob, enabling re-transmission to another RFID reader or terminal, optionally with encryption/decryption capability.

In another embodiment, the RFID reader apparatus (150) comprises:
 a housing;
 a slot for a contact or contactless fob;
 a slot for a USB stick;
 an immobilizer transponder (electronic immobilizer 134); and
 a motor vehicle key alternately protruding from the housing and retracted within the housing.
The RFID reader apparatus may further comprise:
 additional slots for receiving SD memory, SDIO wireless, and the like.

The contact or contactless fob imparts the desired "personality" to the RFID reader apparatus.

The RFID reader (100, 150) can also transmit to other readers. For example, it can read information from the fob (116, 166) and retransmit it (such as to another reader). (The fob is generally passive, and does not have its own power for transmitting.)

The apparatus has an inherent "anti-skimming" feature. If the housing is metal (or metallized), when the contactless fob (116, 166) is inserted into the housing, it cannot be read by a nearby unauthorized person, because the antenna within the fob is shielded by the housing of the reader. The reader has its own antenna, and can re-transmit information obtained from the inserted fob in various formats (wireless, contactless, etc), under control of the user.

The invention is generally directed to an RFID reader (100, 150)—Transponder (116, 166)—Token (integrated in the reader 100; or in the reader 150 or in the USB stick 162) with Biometric Identifier (110)—Wireless Client (integrated into 100, 150; or enabled by the SDIO card 117, 167)—and Mass Storage (216, or SD memory stick 118, 168) device in one. Each function operates interchangeably. For example, it (100, 150) can act as a reader or a transponder at the same time.

The RFID reader apparatus (100, 150) has a first level of capability (over standard terminals), plus two levels of personality:

1. The inherent capability as a multi-interface RFID reader:
 RFID Agnostic reading all standard tags/contactless smart card fobs (capability of reading from and writing to all contactless smart cards, all protocols).
 Read/Write device in contactless mode, with re-transmission (in contactless, wireless or optical mode)
 Can generate time-synchronous passwords in sync with an Internet Atomic Clock (the reader can synchronize itself periodically with an Internet Atomic Clock to maintain the requisite precision for time-synchronous passwords).
 Can convert smart card protocol to TCP/IP signals, USB serial data to TCP/IP, USB serial data into contactless or wireless signals and vice-versa.
 Encryption engine for secure communication (token function) with a host computer.

2. The first level of personality is gained when the contactless smart card fob issued by a provider is inserted to its housing.

3. The second level of personality authenticating the cardholder/user is the biometric identifier.

According to an embodiment of the invention, a RFID reader apparatus comprises: a contactless interface; and a slot for insertion of a contactless smart card fob. The apparatus may personalized at two levels, firstly by the insertion of a contactless smart card fob with a cardholders' credentials into the slot, and secondly at the initialization stage, by the cardholder taking a digital imprint of their finger or thumb and storing the biometric profile in the memory of the apparatus. An actuator may be associated with a biometric sensor in the apparatus for turning on the apparatus. The apparatus may further comprise a wireless interface; and a slot for insertion of a wireless SD I/O device. The apparatus may also comprise a slot for insertion of an external memory device. The apparatus may also comprise a mechanical connection (contact) interface. The apparatus may also comprise an RF interface for reading an electronic immobilizer; and an electronic immobilizer disposed within the apparatus. The apparatus may be pocket-size.

Other objects, features and advantages of the invention will become apparent in light of the following description(s) thereof.

BRIEF DESCRIPTION OF THE DRAWINGS

The structure, operation, and advantages of the present invention will become further apparent upon consideration of the following description taken in conjunction with the accompanying figures (Figures.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

DETAILED DESCRIPTION OF THE INVENTION

Figure 1A:
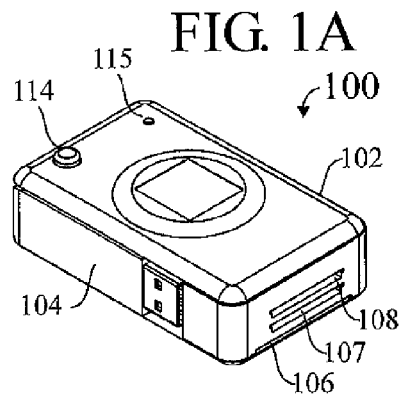
FIG. 1A is a perspective view of an embodiment of an RFID reader apparatus, with a retractable USB stick in a closed position, according to the invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

RFID Reader Apparatus, Generally

An embodiment of the invention is generally directed to a compact personal (portable) RFID reader apparatus with a slot (or hatch) to accommodate a transponder or contactless fob. The RFID reader apparatus can be plugged into (or connected wirelessly with) a personal computer (PC) and interfaced with the "virtual world" of the Internet. The contactless fob can also be a dual interface device with smart card contacts and contactless function. The RFID reader apparatus (or, as will be evident, a portion of a modular apparatus) can then be removed (disconnected) from the PC (disconnected from the Internet) and used to conduct "real world" transactions.

The RFID reader apparatus may comprise a contactless interface and a wireless interface. It also may also have slots to accommodate Secure Digital devices such as SD memory sticks, SD transponder and a SD I/O wireless card. It may also have a USB stick for connecting to a PC, or a USB plug for receiving a USB stick. It may also have a key for starting a motor vehicle.

FIGS. 1A-1F illustrate an embodiment of the RFID reader apparatus 100, generally.

The apparatus 100 comprises a generally rectangular prismatic, pocket size housing 102, approximately the size of a pack of cigarettes (or a vehicle key), such as approximately 35 mm (W)×approximately 70 mm (L)×approximately 15 mm (D).

Figure 1B:
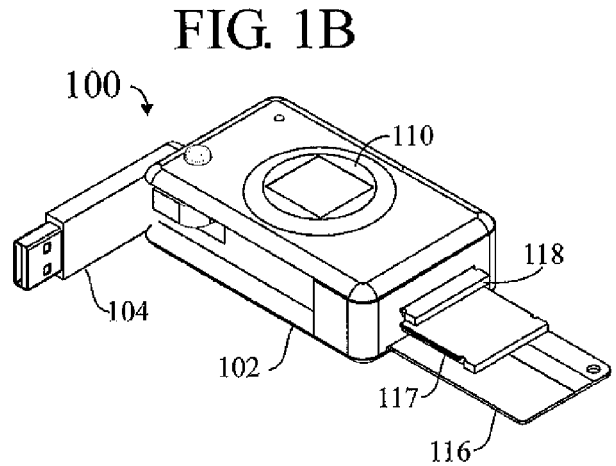
FIG. 1B is a perspective view of the RFID reader apparatus of FIG. 1A, with the USB stick in an open position, according to the invention.
Figure 1C:
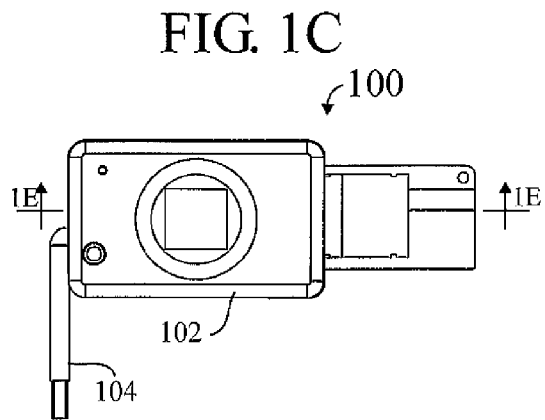
FIG. 1C is a top view of the RFID reader apparatus of FIG. 1A, according to the invention.
Figure 1D:
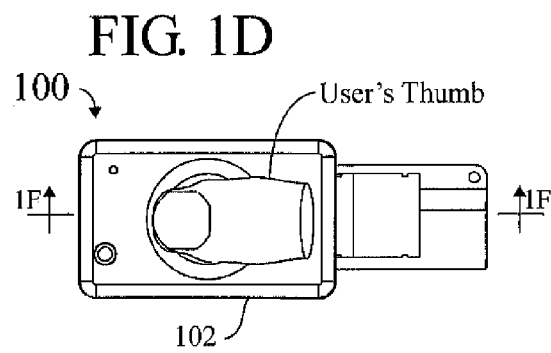
FIG. 1D is a top view of the RFID reader apparatus of FIG. 1B, showing a user's thumb on a membrane sensor, according to the invention.

A USB stick 104, which may or may not have internal memory (in the latter case, being used primarily as a mechanical/contact-interface connection) can extend from the housing (FIG. 1A) or be retracted into a side of the housing (FIG. 1B).

The housing has three slots 106, 107 and 108 (FIG. 1A) at one end thereof for receiving external devices such as a contactless smart card fob 116, an SDIO wireless device 117 and an SD Memory Stick 118.

A biometric membrane sensor (flexible) 110 may be incorporated in the RFID reader apparatus which, when depressed by the user, activates a switch 112 located under the membrane 110 to power-up (activate) the RFID reader apparatus 100 when the biometric sensor 110 is being used (such as to identify the user for a transaction).

The RFID apparatus 100 may have a slide switch (not shown) covering the biometric sensor 110 which when revealed activates the apparatus (rather than the switch 112). (In this context, a "slide switch" can be comparable to well-known sliding lens covers over the lenses of digital cameras.)

The figures show a button 114 for releasing the USB stick 104, and an LED 115 for indicating an operating state (or states) of the apparatus, such as ON and OFF. (A blinking light can also indicate an operational state.) Other switches, and human interfaces (audio jacks, display, etc.) may be incorporated into the apparatus 100. The membrane sensor 110 is considered to be a "human interface".

Figure 1E:
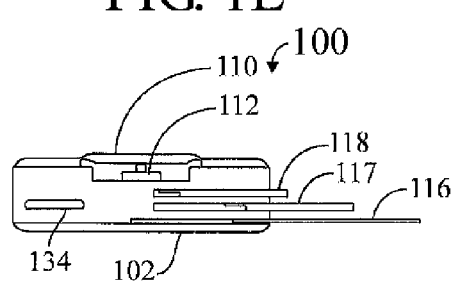
FIG. 1E is a cross-sectional view of the RFID reader apparatus of FIG. 1C, according to the invention.
Figure 1F:
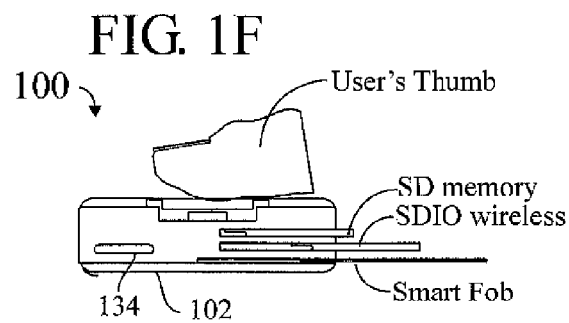
FIG. 1F is a cross-sectional view of the RFID reader apparatus of FIG. 1D, according to the invention.

FIGS. 1E and 1F (cross-sections) show an electronic immobilizer 134 is disposed within the housing 102. (This is not particularly relevant to the embodiment 100, but is relevant for the next embodiment of RFID reader 150, discussed hereinbelow.)

How It Works

The RFID reader apparatus 100 is initially generic—that is, it is generally the same for any user, before being personalized for a given user.

The contactless (or contact) smart card fob 116 is personalized by an issuer such as a financial service provider and contains secure identification codes, credentials, privileges, bank details, etc. When plugged into the apparatus 100, the fob 116 gives the apparatus 100 a first layer of personality (uniqueness).

The fob 116 can communicate with the apparatus 100 via a contactless interface (212), and can later be used independently of the apparatus 100 for other contactless transactions.

The card holder (user of the reader) can give the apparatus 100 a second layer of personality by storing a biometric template of their finger or thumb in the memory of the apparatus 100 during an initialization process. (The finger/thumbprint is exemplary of any suitable biometric characteristic of the user, stored as biometric profile stored in the memory of the reader for predefined applications.)

In other words, the contactless smart card fob 116 is unique for a given user, and when inserted into the apparatus 100 imparts "personality" to the apparatus 100. In addition, the apparatus 100 stores a biometric template of the card holder, making it non-functional for anyone else. This combination of a contactless smart card fob and a biometric identifier allows for two factor authentication in any application.

The purpose of the biometric sensor 110 is to measure a live biometric parameter (such as finger- or thumbprint) of an unverified user, to compare the stored biometric template of the authorized user in the memory of the apparatus 100 or contactless smart card fob 116 with the measured data. Then, a transaction (such as secure entry or payment) can be confirmed by sending a contactless or wireless authorization signal to an external device (e.g. door lock, financial terminal, etc).

The coupling of a contactless smart card fob ("something the user has") and performing biometric ID authentication (1:1 fingerprint matching) ("something about the user") creates a strong tool for authenticating the true identity of a person in any application (Internet based, payment, physical & logical access, etc).

The fingerprint (biometric) template of the user resides in the memory (204) of the RFID reader apparatus 100, 150, for personalizing the apparatus. Alternatively, the fingerprint template of the user can reside in the contactless smart card fob (116, 166), but that would not serve the purpose of "personalizing" the reader apparatus (100, 150).

When a user wants to initiate a transaction (such as a financial transaction) with an external entity (such as a POS vendor) the user presses on the biometric sensor, which then measures a current fingerprint pattern of the user, the apparatus compares the current measured fingerprint pattern with the template of the authorized user's fingerprint which is stored in the memory of the apparatus, and if there is a match, the apparatus can send a contactless or wireless authorization signal to the external entity.

The SD card 118, 168 is generally intended to be simply a storage device, such as for MP3 music, allowing the user to "manually" transport downloaded files from the RFID apparatus 100, 150 to another, external apparatus (not shown) such as a car radio with an SD slot.

The SD I/O card 117, 167 is generally intended to be either a wireless PAN device for private networking or a wireless LAN device for more public networking. It can also be a token device, with or without wireless function.

The SD card 118, 168 can also function as a token. For example, a bank may issue the contactless smart card fob 116, 166 to a user, then separately (for security purposes) issue an SD token 118, 168 to the user.

Either the SD card 118, 168 or the SD I/O card 117, 167, in the function of a secure token, can have a hatch (not shown) for receiving a SIM card insert (not shown).

Additionally, the apparatus (100, but particularly 150) can have an electronic immobilizer 134, which is essentially another transponder (in addition to the fob 116, 166). The immobilizer 134 normally has the function of authorizing the user to perform an action in an external entity (authentication of user), such as starting a vehicle engine.

Another Embodiment

Figure 1G:
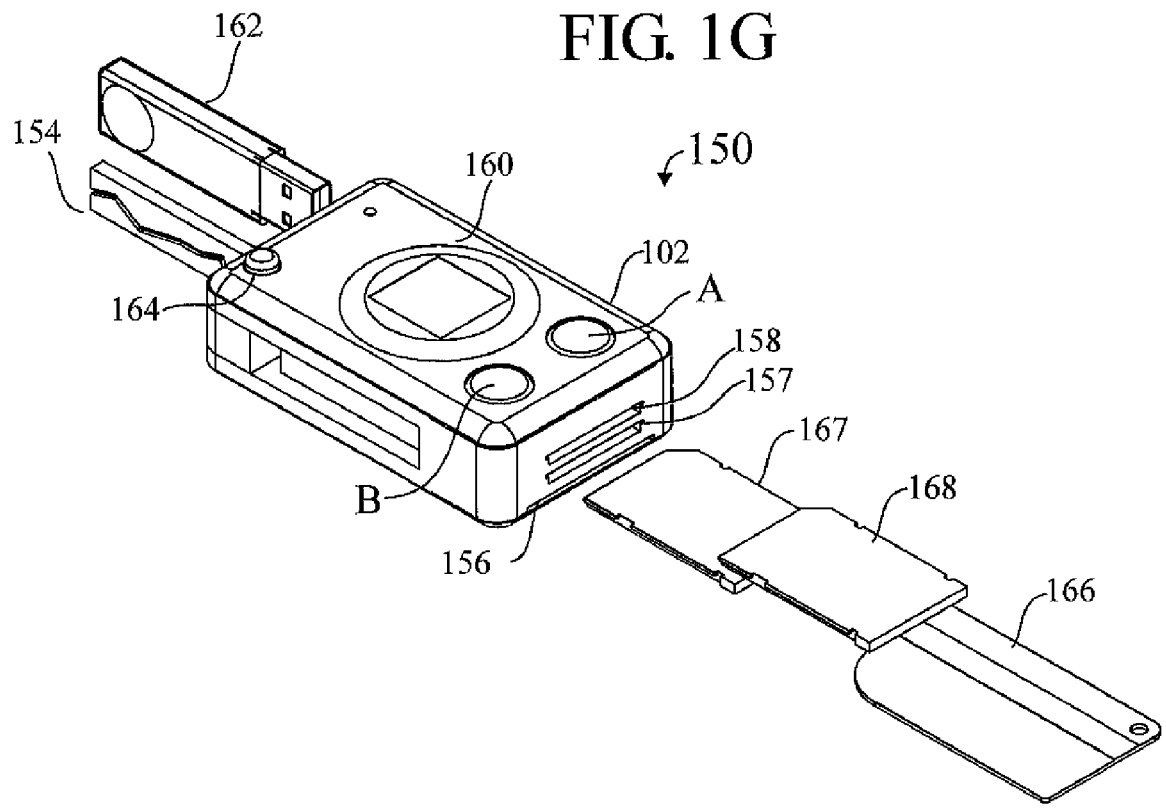
FIG. 1G is a perspective view of an alternate embodiment of an RFID reader apparatus ("vehicle immobilizer", with a removable USB stick and retractable vehicle key shown in an open position, according to the invention.

FIG. 1G illustrates another embodiment of an RFID reader apparatus 150 similar in size, shape and function to the apparatus 100 of FIGS. 1A-1F, but with some changes and additions, and termed "vehicle immobilizer", as follows.

The apparatus 150 has a generally rectangular prismatic, pocket size housing 152, approximately the size of a pack of cigarettes (or a vehicle key), such as approximately 35 mm (W)×approximately 70 mm (L)×approximately 15 mm (D). It is "pocket size", which is generally smaller than "hand held".

The housing has three slots 156, 157 and 158 (FIG. 1A) at one end thereof for receiving external devices such as a contactless smart card fob 166, an SDIO wireless device 167 and an SD Memory Stick 168.

A biometric membrane sensor (flexible) 160 may be incorporated in the RFID reader apparatus 150 which, when depressed by the user, activates a switch (not shown, see 112) located under the membrane 160 to power-up the RFID reader apparatus 150. The RFID reader apparatus 150 may have a slide switch (not shown) covering a biometric sensor 160 which when revealed activates the apparatus.

The apparatus 150 is generic—that is, it is generally the same for any user. The contactless (or contact) smart card fob 166 is personalized by an issuer such as a financial service provider and contains secure identification codes, credentials, privileges, bank details, etc. The card holder can give the reader a second layer of personality by storing a biometric template of their finger or thumb in the memory of the reader during the initialization process. This means that the contactless smart card fob is unique for a given user, and when inserted into the reader apparatus 150 imparts "personality" to the reader. In addition, the reader stores a biometric template of the card holder making it non-functional for anyone else. This combination of a contactless smart card fob and a biometric identifier allows for two factor authentication in any application.

An LED 115 indicates an operating state (or states) of the apparatus 150, such as ON and OFF. (A blinking light can also indicate an operational state.) Other switches, and human interfaces (audio jacks, display, etc.) may be incorporated into the apparatus 150. The membrane sensor 160 is considered to be a "human interface".

Two button switches labeled A and B can be for remote control car-related functions such as opening (unlocking) the door and or popping the trunk (boot) open.

In this embodiment of the RFID reader apparatus 150, hereinafter termed "vehicle immobilizer", rather than having a releasable USB stick (104) alternately retracted into and extending from the housing, there is a conventional motor vehicle key 154 extending from the housing, and controlled by the button 164 (compare 114).

In this embodiment (vehicle immobilizer), there is a separate USB stick 162, and corresponding USB plug (not visible) for plugging the USB stick 162 into the apparatus 150. In this embodiment, rather than the USB stick functioning primarily as a mechanical/contact-interface connection for plugging the apparatus 150 in to a PC (Internet-capable appliance), the USB stick 162 is removable. The USB stick 162 may be a wireless dongle (Zigbee, Bluetooth, UWB etc) for private area networking, which can be plugged into an Internet connected PC and communicate in wireless mode with the RFID reader apparatus (the devices are paired). In simple terms, the RFID reader apparatus 150 in its' docking station (see FIG. 4) can communicate with a nearby PC without physical wire connection and e-money, value, content or data can be transferred from the PC, via the wireless USB dongle to the memory of the RFID reader apparatus 150.

The purpose of the separate, detachable USB stick 162 in this embodiment 150 (as opposed to the built-in USB stick 104 in the other embodiment 100) may be to function as a Bluetooth or wireless interface. The user can take it out of the housing and insert it into a PC, then effect communication between the RFID reader apparatus 150 and the PC.

In this embodiment (vehicle immobilizer) of the RFID reader apparatus 150, a mechanical key, an immobilizer transponder (electronic immobilizer 134, see FIGS. 1E and 1F) operating at 125 KHz (low frequency) and a remote control function (optical or wireless) is incorporated into the housing. The reader apparatus 150 can operate at both RFID frequencies of 125 KHz and 13.56 MHz and information pertaining to the vehicle such as service intervals and mileage on the clock can be stored in the transponder, whereas information pertaining to the authorized user such as identification number, biometric templates, medical data, insurance numbers, bank details, passwords etc are stored in the contactless smart card fob. In addition, the apparatus 150 has a removable wireless USB dongle (Zigbee, Bluetooth, UWB) to enable paired communication between a PC and the apparatus.

In certain applications, it may be necessary to replace the SD memory (118, 168) with a secure SD token. Meaning that the issuer of the contactless fob may also issue an encryption token for communcication.

Our removable USB dongle 162 may also act as a token when connected to an Internet capable PC.

Access to memory 204 or 118 & 168 may only be permissible when the contactless fob (116, 166) is inserted into the housing (optional feature)

Figure 2A:
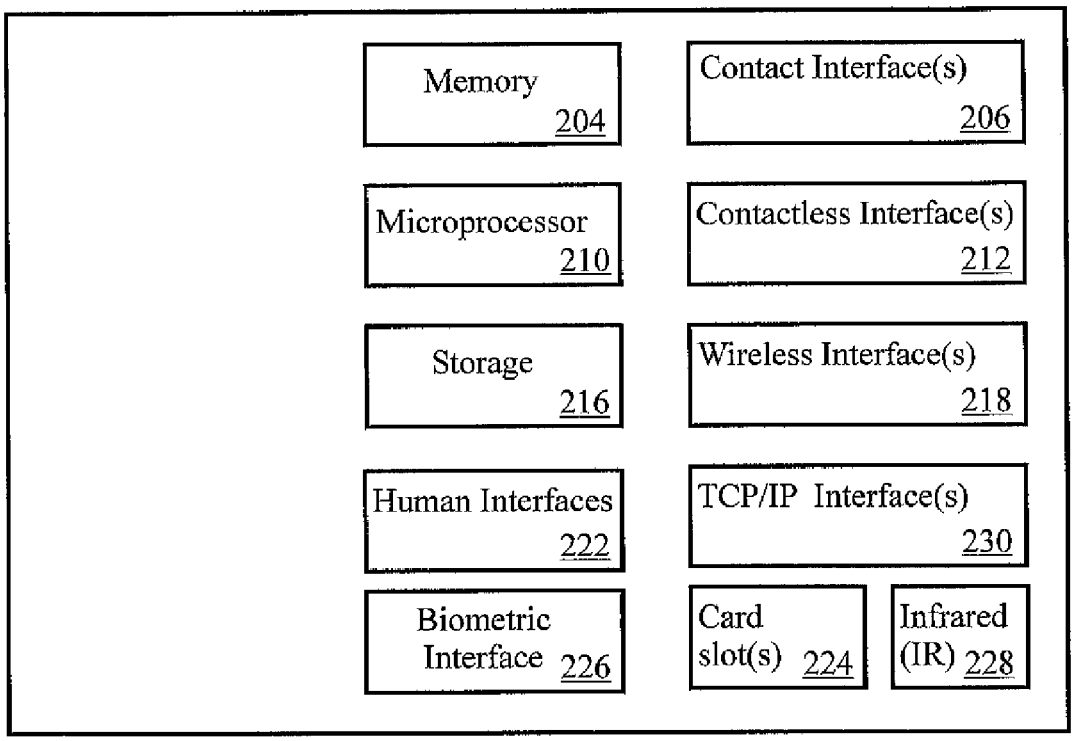
FIG. 2A is a diagram of major functional blocks of an RFID reader apparatus, according to the invention.

FIG. 2A illustrates major functional blocks of an embodiment of the RFID reader apparatus 100, which may include (but are not limited to):
- memory 204
- contact interfaces 206, such as (but not limited to) USB (or smart card ISO 7816)
- a microprocessor 210 for controlling the operation of the other functional blocks
- contactless interfaces 212, such as (but not limited to) ISO 14443, ISO 15693 and NFC (and any similar interface)
- storage 216, such as (but not limited to) a hard drive (HDD)
- wireless interfaces 218, such as (but not limited to) IEEE 802.11
- human interfaces 222, such as (but not limited to) display, keyboard, switches, microphone, headphone
- card slots 224 (which are contact interfaces) for inserting SD cards, and the like
- biometric membrane sensor 226
- optical/infrared (IR) interface (sensor and sender) 228
- TCP/IP interface(s) 230 for communicating via networks, such as (but not limited to) the Internet.

Storage 216 may be an internal flash drive or an HDD augmented by external memory such as a removable SD memory stick. (Memory 204 may be standard RAM for the microprocessor 210.)

Such an RFID reader apparatus 100 with multiple interfaces (mechanical, contactless, wireless and optical), extended memory (flash and/or hard disk drive) and a slot to insert a transponder device or contactless smart card fob, as discussed hereinbelow, can be used in a plethora of applications such as logical and physical access, secure identification, ticketing, payment and e-commerce.

The RFID reader apparatus 100 may be configured for transferring messages & data from the contactless interface 212 the wireless interface 218 in active mode and to run contactless to wireless applications.

The RFID reader apparatus 100 may be configured for interfacing with the Internet (via TCP/IP interface 230) and emulating a smart card. In real world applications, the apparatus is a "mobile wallet" used as prepaid electronic cash, tickets, ID, access to buildings and corporate networks, membership cards for clubs and loyalty programmes, etc.

The RFID reader apparatus 100 may include a standard-compliant contactless interface and a wireless client interface; wherein the contactless interface 212 complies to one or more of the following standard interfaces: RFID-contactless interface according to ISO 14443 & ISO 15693 and NFC; and wherein the wireless client interface 218 comprises at least one of the interfaces selected from the group consisting of Zigbee, Bluetooth, WLAN 802.11, UWB, USB wireless and any similar interface.

Multiple ISO Standard Protocols (Mifare, ISO 14443, ISO 15693, etc) can be stored or masked to memory 204, making the apparatus RFID agnostic (any standard communication interface) for use in a combination of applications such as physical & logical access as well as payment.

The RFID reader apparatus 100 operates in conjunction with the inserted contactless smart card fob (116, FIG. 1B) and communicates with:
- an Internet connected PC via it's mechanical interface such as USB,
- an external RFID terminal via it's contactless interface,
- an external dongle or token plugged into a PC via it's Zigbee/Bluetooth interface (PAN),
- a mobile device via it's NFC/Bluetooth interface, and with a WiFi network (WAN) via it's wireless interface.

The communication protocol between the RFID reader apparatus 100/Contactless smart card fob 116 and an external (see FIG. 3) RFID reader, terminal, handheld or kiosk can include transponder information or electronic value residing in the memory of the contactless chip and/or an authorization signal with encrypted keys (generated by matching a stored biometric template with a live fingerprint or thumbprint scan).

Figure 2B:
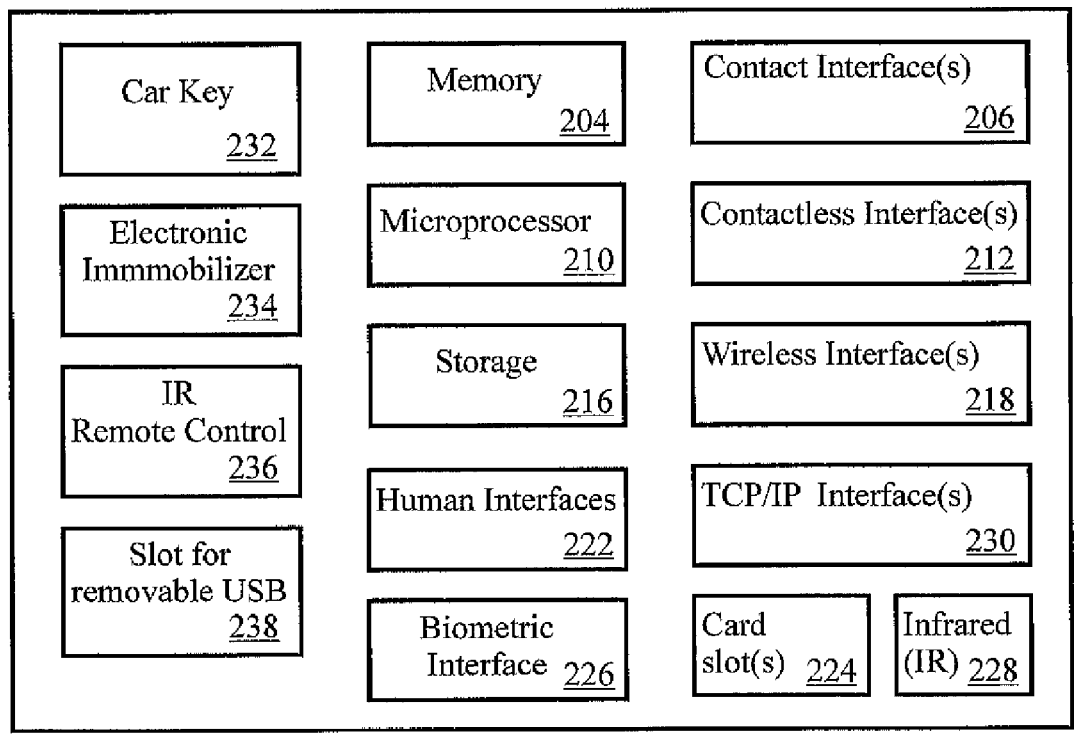
FIG. 2B is a diagram of major functional blocks of a "vehicle immobilizer", according to the invention.

FIG. 2B illustrates major functional blocks of an alternate embodiment of the RFID reader apparatus (vehicle immobilizer) 150 which generally may comprise all of the functional blocks described hereinabove (RFID reader apparatus 100 of FIG. 2A), plus the following additional functional blocks:
- the mechanical car key 232 (154),
- internal 125 KHz transponder (electronic immobilizer) 234 for inductive coupling with the RFID reader in the steering column lock,
- an infrared (IR) sensor/sender (optical; remote control) 236 for remote control applications; and
- the slot 238 for a removable USB (Zigbee/Bluetooth) dongle (162) or token for wireless communication from the apparatus to the dongle inserted into a port of an Internet connected PC.

The RFID reader apparatus 150 can read/write at 125 KHz and 13.56 MHz. For example, it might be necessary to write to the 125 KHz transponder for service data, mileage, etc. as well as a key for mechanical access to a vehicle, building, safe, locker, and the like. It might also be necessary for the RFID reader apparatus 150 to read from the 125 KHz transponder. Therefore, the block 234 labeled "Electronic Immobilizer" includes an RF interface for interfacing with the Electronic Immobilizer.

Applications for the RFID Reader 100 (and Vehicle Immobilizer 150)

Generally, in the descriptions that follow, either the RFID reader 100 (FIG. 2A) or the vehicle immobilizer 150 (FIG. 2B) can be used to achieve the described functionality, unless otherwise noted (or as may be evident to one of ordinary skill in the art from the context of a functional description). Hence "RFID reader apparatus" should be presumed to refer either to the apparatus 100 or the apparatus 150.

The RFID reader apparatus via its contact interface 206 or its wireless interface 218 (and TCP/IP interface 230) can synchronize itself with an Internet atomic clock, allowing every event & transaction to be recorded with an exact time/date stamp.

The RFID reader apparatus can generate "One-Time-Passwords" (OTP) when in an electromagnetic field or in a wireless hotspot. Each password can be synchronized or encrypted with the time from a public NTP server (Internet Atomic Clock).

The RFID reader apparatus accommodates Single Sign-on access to password protected sites by reading the inserted contactless smart card fob which stores dynamic encrypted keys in synchronization with an Internet atomic clock, and the fingerprint template of the user. Only when the RFID reader apparatus matches a live fingerprint scan with the stored template in its memory, is it possible to use the internal PIN to enter a website with the correct login ID and password.

The RFID reader apparatus can validate whether a person is allowed to access a network (logical access) or enter a facility (physical access) using it's wireless interface. Real time upgrading & revoking of privileges or authorizing certain activities and access permissions can be implemented when the user is in a WPAN (wireless personal area network) or a WLAN (wireless local area network) such as a hot spot or office building. Revoking or granting of privileges can be via the wireless interface of the apparatus and such messages can be embedded in the EEPROM of the RFID device or in mass storage. The transmission of real time credentials can be via the host, contactless or wireless interface.

To save on power consumption the RFID reader apparatus can receive or transmit data via its wireless interface on a periodic basis as well as powering down during periods of inactivity (sleep mode). The RFID reader apparatus can also monitor and record environmental parameters such as temperature and humidity. If the RFID reader apparatus is lost, location determination (Real-Time Location System) is possible when in a WiFi network. In addition to location calculation, the RFID reader apparatus can use its wireless interface to receive configuration data making it field upgradeable.

The RFID reader apparatus can store images, such as CT scans, MRIs, and ultrasound in DICOM (Digital Imaging and Communications) standard file format. The RFID reader apparatus is for those with ongoing medical conditions such as asthma, epilepsy, those with drug or food allergies, those taking multiple medications and the elderly who want to maintain their mobility and freedom.

The RFID reader apparatus (specifically, the vehicle immobilizer 150) can serve as a vehicle immobilizer with multiple interfaces and slots to accommodate a contactless smart card fob for physical and logical access, a SD memory device for storage of music files or data and a pocket to accept a USB (Zigbee/Bluetooth) dongle.

Figure 3:
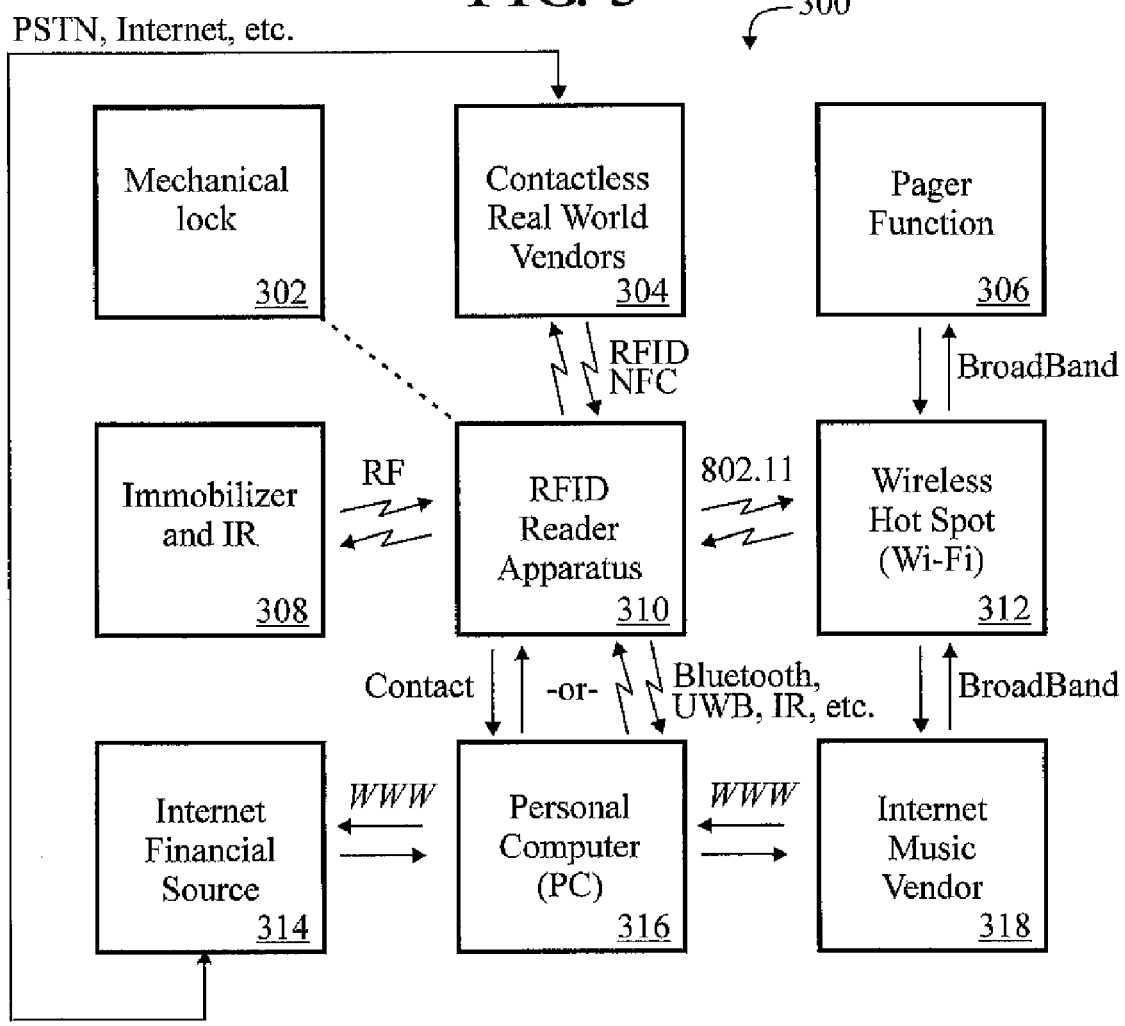
FIG. 3 is a diagram of an environment in which an RFID reader apparatus capable of operating and interacting, according to the invention.

FIG. 3 illustrates an overall environment 300 in which the RFID reader apparatus 100 is capable of operating and interacting with other entities and devices in the environment, using the various communications links. Included are functions specific to the vehicle immobilizer apparatus 150 "extension" of the RFID reader apparatus 100. RFID reader apparatus 310 should be presumed to refer either to the apparatus 100 or the apparatus 150.

The RFID reader apparatus 310 can communicate with a personal computer (PC) 316 over a contact interface such as USB and/or over a PAN wireless interface such as Zigbee, Bluetooth, UWB, IR, and other similar wireless interfaces.

The PC 316 can interact with the RFID reader apparatus 310 to receive data from the RFID reader apparatus 310 and to send data to the RFID reader apparatus 310. The PC 316 is an Internet-capable appliance which provides access to the Internet (WWW) for the RFID reader apparatus 310. The PC 316 gains access to the Internet via a TCP/IP link, such as telephone modem, ADSL, and other similar TCP/IP links.

The RFID reader apparatus 310 is a portable device and, as such, can be used to gain access to the Internet over a WAN wireless interface such as IEEE 802.11 in a wireless (Wi-Fi) hot spot 312, such as an Internet cafe. The wireless hot spot 312 would typically have broadband access to the Internet via a TCP/IP link, such as telephone modem, ADSL, and other similar TCP/IP links.

With Internet access (WWW), the RFID reader apparatus 310 can interact with an Internet Music Vendor 318, either via the user's PC 316 or via the wireless hot spot 312.

With Internet access (WWW), the RFID reader apparatus 310 can also interact with an Internet Financial Source 314, such as to conduct financial transactions (uploading or downloading credits). The Internet Financial Source 314 may communicate with Real World Vendors 304 such as a department store, over a direct modem link (not described hereinabove) using the public switched telephone network (PSTN), or via a TCP/IP link using the Internet to conduct their financial transactions with one another.

Generally, there appears to be no need for the apparatus 310 to have a WiMAX interface, but the apparatus 310 is not limited to excluding WiMAX capability. (Very generally speaking, WiMAX is a longer-range version of Wi-Fi.)

Via its contactless interface, the RFID reader apparatus 310 can interact directly with the contactless real world vendors 304.

For example, the user downloads credits onto his RFID reader apparatus (100, 150) from the Internet Financial Source 314 and at the Real World Vendor 304 can interact via the apparatus' contactless interface to purchase items using his downloaded credits.

For example, the user downloads credits onto his RFID reader apparatus 310 from the Internet Financial Source 314 and can download songs from the Internet music download site 318 using his downloaded credits. The downloaded music can be stored on the users SD memory stick 118 (168).

The SD memory stick (118, 168) containing music files can be inserted into (and removed from) a slot on a car radio control panel (the car radio having MP3 capability). Or, by remaining inserted into the apparatus 310, and with the addition of a simple FM transmitter (not shown) in the apparatus 310 (or in one of its plug in modules, such as SDIO 117, 167), could be used to transmit MP3 music to the car radio (on an empty FM channel).

Block 302 represents the mechanical key 154 of the apparatus 310 (specifically, the immobilizer 150), which can be used to open a vehicle, a secure building, a safe, etc). A mechanical linkage is indicated by the dashed line.

Block 308 represents the combination of the electronic immobilizer (125 KHz) and the Infrared remote control function. Normally, the remote control function for opening the vehicle door is a separate entity to the immobilizer function for starting the engine. However, the apparatus 310 could read the "electronic immobilizer" (via a 125 KHz RF link; in the housing, typically a plastic brick or a glass tube, not shown) and allow the user to open their vehicle at short range with the optical or wireless remote control interface, by transmitting the encrypted codes stored in the electronic immobilizer to the vehicle.

In the case that the car battery is dead, the mechanical key could be used to open the vehicle door.

Note the RFID reader apparatus 310 operates at dual frequencies (125 KHz, 13.56 MHz) and because of its wireless interface, it is in fact a triple frequency apparatus.

Block 306 represents a pager function for use in a "Private Area Network", such as in a corporate environment. The overall concept for the apparatus is secure identification & authentication for physical & logical access as well as payment. The messaging service (306) is a one-way information vehicle using the wireless network to communicate a short text to the user. The text can be a reminder preset by the user for a certain time, a command or to inform of a waiting call. The apparatus 100, 150 is approximately the same size of a pager and in addition could be clipped onto a person's belt.

In addition to messaging, the apparatus can synchronize its internal clock with an Internet atomic clock on a periodic basis for the purpose of generating Transaction Authentication Numbers (TAN) and time synchronous One-Time-Passwords (OTP).

The apparatus 310 (100, 150) can also have the user's medical record storage (as discussed hereinbelow) stored in its personalized fob 116, 166.

Prior Art Material Relating To Biometrics

U.S. Pat. No. 6,681,034 discloses method and system for fingerprint template matching. A method for matching templates and a system thereof. Each template includes a plurality of data chunks, each data chunk representing a minutia and comprising a location, a minutia angle and a neighborhood. The location is represented by two coordinates. In one embodiment, each coordinate and the minutia angle are quantized. The neighborhood includes positional parameters with respect to a selected minutia for a predetermined number of neighbor minutiae. In one embodiment, a neighborhood boundary is drawn around the selected minutia and neighbor minutiae are selected from the enclosed area. A reference template is compared to a measured template on a chunk-by-chunk basis. A chunk from each of the template is loaded into a random access memory (RAM). The location, minutia angle and neighborhood of the reference data chunk are compared with the location, minutia angle and neighborhood of the measured data chunk, respectively. In one embodiment, the comparison uses straight subtractions. If the differences for all the parameters meet their respective predetermined tolerances, the measured data chunk matches the reference data chunk. If the number of data chunk matches is equal to or is greater than a predetermined data chunk match rate, the measured template matches the reference template. The neighborhoods are compared by comparing each positional parameter. If all the positional parameters match, the neighbors match. If a predetermined number of neighbor matches is met, the neighborhoods match. Claim 1 and 2 of the '034 patent recite, 1. A fingerprint verification system, comprising: a smart card reader, said smart card reader comprising: a fingerprint sensor; and a first microprocessor, said first microprocessor generating a measured template having a plurality of measured data chunks from data read by said fingerprint sensor; a smart card, said smart card comprising: a static memory, said static memory storing a reference template having a plurality of reference data chunks; a second microprocessor, said second microprocessor executing a matching algorithm for determining whether said measured template matches said reference template; and a random access memory, said random access memory (RAM) storing only one reference data chunk and only one measured data chunk during execution of said matching algorithm; and a communication channel between said smart card and said smart card reader.

2. The system of claim 1, wherein a measured data chunk is loaded into said RAM of said smart card through said communication channel.

The '034 patent discloses the idea of storing the biometric template on the smart card.

The RFID reader apparatus (100, 150) of the present invention may be distinguished from the teachings of the '034 patent, as follows. Contactless smart card fobs are issued by financial service providers such as a credit card institute with bank related details stored in the memory of the chip. In practical terms, it is not possible to scan & store the fingerprint of every cardholder, before issuance of such smart card fobs. Using the RFID reader apparatus the user can self-enroll by scanning the structural characteristics of one of their fingers during the initialization process and storing the biometric template in the memory of the reader.

For certain transactions, the reader can only be unlocked by the cardholder placing their figure on the biometric sensor for authentication. In addition, the contactless smart card fob can be encoded with encryption keys which links or couples the reader to the fob and the reverse holds also true (vice-versa).

Portable Apparatus for the Transfer and Storage of Medical Images with Radio Frequency Identification Heart condition patients, oncology patients and selective category patients such as those with AIDS, renal dialysis patients, patients on immunosuppressant or high-tech prescriptions, patients awaiting organ-transplants, etc who wish to remain mobile without compromising their health care, require some sort of personal identification in the case of an emergency. In addition, the physician treating the patient requires instant access to their medical history and treatment to date.

A number of countries have introduced social insurance smart cards containing administrative & health data about the cardholders Although these smart cards use a special cryptographic function guaranteeing that the data on the card is protected against illegal attacks and only authorized medical staff has access to the patient's data, the chip memory size of 64 kilobytes is insufficient to store images. A chest X-ray for example requires approximately 11 megabytes of data storage and typical patient demographics requires between 4 and 12 Megabytes of memory space on the hospital information system.

More recently such electronic cards are been used as a citizen card containing a Personal Public Service (PPS) number that allows the cardholder to access social welfare benefits and information from public service agencies (government authorities), such as the department of social and family affairs, the revenue commissioners and the health boards.

Further possible extensions of the smart card include integration of hospitals and pharmacies (electronic prescriptions), internationally accepted electronic health insurance smart card and integration of social security registration procedures.

The use of a PPS number is not limited to social welfare services or social insurance institutions, but can be used for annual statement of pay, tax and social insurance contributions, medical card and drugs payment scheme, free travel pass, student ID, child immunization, mortgage interest relief, housing grants, driver theory testing and driver licenses.

But in returning to the central issue of patient identification and storage of medical data, it is evident that the traditional smart card has a number of limitations, namely memory space and requires a mechanical reader to access the data.

The RFID reader apparatus (100, 150) of the present invention can integrate patient identification and mass storage in a single apparatus in the form of an electronic talisman. It should be noted that the device is not only for selected category patients, but also could be issued to healthy individuals, such as organ donors.

An Embodiment of the Invention

The RFID reader apparatus (100, 150) of the present invention (or a truncated version thereof, having only the necessary functionality) can store all medical imaging modalities including standard X-rays, CT scans, MRI, Ultrasound & Nuclear Medicine in it's Flash Memory and/or Hard Disk Drive and allows images to be interpreted on computer work stations in any decentralized location.

The apparatus (100, 150) can store the images, such as CT scans, MRIs, and ultrasound in DICOM (Digital Imaging and Communications) standard file format. A single DICOM file contains both a header (which stores information about the patient's name, the type of scan, image dimensions, etc), as well as all of the image data (which can contain information in three dimensions). Files can be compressed using lossy or lossless variants of the JPEG format, as well as a lossless Run-Length Encoding format.

The apparatus (100, 150) can store in encrypted format, the patient demographics (age, blood type, medication, allergies, etc), reports and audio report summaries.

The benefits of the apparatus are multi-fold;

Ease of consultation with instant access to images and reports

Patients need no longer bring their X-rays to their physicians

Providing clinicians and patients with a filmless picture archiving communication system that will significantly improve patient care The apparatus (100, 150) can generate "One Time Passwords" for security and the unique transponder number, which is linked with the PPS number, is embedded in the hard disk drive and/or flash memory.

As described above, the apparatus (100, 150) can be used for mass storage of medical health records, but also can be used in the hospital environment for patient care treatment, identification, electronic payment at the restaurants or kiosks, access to the hospital parking lot, to provide insurance details and to pay (debit or credit) for affiliated services. In addition the apparatus can have a stored value function such as a health gift voucher allowing the user to use the apparatus to cover the cost of an annual physical check-up at the local hospital. Prescriptions can be stored in the device, or the apparatus can be used as a vehicle to allow the automatic transfer of electronic prescriptions to the patient's preferred pharmacy or drug store. Different security keys can reside in the apparatus to allow entry by the hospital doctor, administration, general practitioner, pharmacy, etc.

The apparatus can be used in an on-line patient appointment system.

Medical doctors and employees of hospitals can also use the apparatus for identification, community networking, access control to the hospital information system, time & attendance and for insurance purposes.

Private insurance companies can provide their members with the apparatus for health promotion (auto-run application), identification, travel insurance and for general health care advice.

The apparatus can store images, such as CT scans, MRIs, and ultrasound in DICOM (Digital Imaging and Communications) standard file format. The apparatus is well-suited for patients with ongoing medical conditions such as asthma, epilepsy, those with drug or food allergies, those taking multiple medications and the elderly who want to maintain their mobility and freedom.

Pendant RFID Apparatus with Mass Storage for Secure Patient Identification

Everyday, patients around the world are submitted to the accident and emergency services unconscious or unable to communicate their medical condition. To avoid treatment delays or medical errors, the emergency staff needs to access the patient's medical records and pertinent information quickly, especially during the "Golden Hour" of a lifesaving situation. Particularly vulnerable are risk patients, who include those with medical device implants, cognitive impairment and chronic diseases such as; seizure disorders, stroke, diabetes, chronic obstructive pulmonary disease (COPD), cardiac conditions, Alzheimer's disease and complex medical treatment.

A portable apparatus (100, 150) for the transfer and storage of medical images with radio frequency identification (RFID) is described hereinabove.

In this embodiment of the invention, a patient identification system uses a pendant talisman apparatus incorporating RFID, Mass Storage, Central Processing Unit and Wireless Technology as well as consisting of a Wireless Handheld Reader for use by healthcare professionals.

A talisman is generally a neck-chain with a screw cap holder (like a pendant) which holds pertinent information relating to the patient's medical condition, blood type, allergies etc. Once the holder is unscrewed, the information in the form of a note can be removed for scrutiny.

To protect the medical records from unauthorized access, but at the same time allowing quick access in an emergency situation, the RFID apparatus (100, 150) generates a one-time password when in the electromagnetic field of a Wireless Handheld Reader used by healthcare professionals. The handheld reader is for long range transmission to the hospital from the ambulance.

For example, in an emergency situation the medical data uploaded to the fob (116, 166) by the patient's doctor or specialist can be read in contactless mode for rapid, accurate and secure identification. The comprehensive medical files can be accessed through the USB/IEEE 1394 port when the contactless smart card fob (116, 166) inserted into the RFID apparatus (100, 150) communicates with the wireless handheld reader carried by a healthcare professional. In addition, the patient's medical records can be stored at a central server.

Currently wireless technology with respect to network complexity and data rate is moving from WLAN to 802.11n and WIMAX, allowing greater range of data transmission and throughput. This will enable ambulance personnel at the scene of an accident or any medical emergency to transmit from a remote position, the patient's medical records stored in the apparatus to the hospital for diagnostics and consultation.

The host communication interfaces of the wireless handheld reader include USB/IEEE 1394, RS-232, TCP/IP, WLAN (Indoors), 802.11n and WIMAX (Outdoors—Remote to Base).

The communication interfaces of the pendant talisman apparatus (100, 150) include RFID, USB/IEEE 1394 and WLAN/802.11n (short range).

The mass storage (216) can be HDD and/or Flash Memory. Recent developments in NAND flash memory technology from Samsung achieving a memory size of 16 Gb (Gigabits), means that most medical records can be stored on a single chip.

The medical data can be stored in standard digital format or as a PDF file and the data can be encrypted and/or compressed. The patient's DNA profile, dental records, vision impairment data etc can also be stored.

The pendant talisman apparatus (100, 150) can have a trademark or logo for easy recognition by medical personnel.

To avoid the problem of viruses moving from the pendant into the medical database of a hospital, executable files are suppressed by the talisman apparatus.

The CPU in the talisman apparatus has sufficient RAM (204) to download the medical records quickly.

Medical associations and insurance companies can benefit immensely from the technology as it reduces the risk of medical errors in an emergency situation, often resulting in expensive malpractice lawsuits. The liability shifts to the patient as they are required to carry the talisman apparatus at all times.

In a further embodiment of the talisman apparatus, the pendant talisman RFID apparatus (with key ring and neck chain) can have a panic button with GPS (global positioning system).

Wireless Electronic Talisman with Interactive Sensors

A portable apparatus (100, 150) is described above for the transfer and storage of medical images with radio frequency identification for use by medical professionals in an emergency situation.

As described above, a passive electronic talisman in the form of a pendant is provided, which can be carried by healthcare patients. Also, the concept is presented of transmitting the stored medical data via a wireless network to a nearby hospital.

This embodiment of the invention builds on the concept as it describes an active electronic talisman with interactive sensors in the form of an armband or watch (Wireless Client Apparatus with Interactive Sensors & RFID), which can transmit measured data from in-built sensors via a wireless access point or router over the Internet to an observation server at a central location or to a host PC monitoring the data. The sensors can be used for purely surveillance purposes to check a patient's heart beat, body temperature, etc or can be activated to electrically stimulate or implement a medical procedure, such as the dosage of insulin. To optimize power consumption, data can be transmitted in periodic sessions.

In a further embodiment of the invention, the armband or watch can communicate or interact with other body sensors. The apparatus can also incorporate a panic button, to alert a medical professional over the Internet.

To avoid interference in a hospital environment the client apparatus can incorporate a spectrum of wireless LAN standards such as; 802.11 n (pre-n MIMO) a/b/g operating at 5.0 GHz and 2.4 GHz band. (IEEE 802.11b and 802.11g standards use the unlicensed 2.4 gigahertz (GHz) band. The 802.11a standard uses the 5 GHz band. Operating in an unregulated frequency band, 802.11b and 802.11g, equipment can incur interference from microwave ovens, cordless phones, and other appliances using the same 2.4 GHz band.)

In another embodiment of the invention, the apparatus (100, 150) transmits over a short range the stored medical data to a wireless terminal or reader via Ultra Wide Band. As Bluetooth does not have the bandwidth to transmit large quantities of data quickly, UWB provides the throughput required.

Portable Wireless Apparatus with a Slot for a Contact or Contactless Smart Card Fob Europay, MasterCard and Visa have created EMV payment specifications which provide a world-wide standard and interoperable framework for credit card payment, debit card payment, cash withdrawal from an ATM and charge-back transactions. Furthermore, MasterCard and Visa have announced that from 2005 onwards they will not be liable for fraud arising from the use of magnetic-stripe cards bearing one of their brands. This means that any current issuers of MasterCard and Visa-branded cards will have to have migrated from magnetic-stripe cards to smart cards, or risk isolation from the EMV network.

In an embodiment of the invention, the wireless apparatus (100, 150) allows the user to insert an ISO credit/debit card into a mechanical slot for payment purposes. The apparatus communicates with the card through physical contact with the smart card chip. Alternatively a contactless card can also be inserted into the slot, whereby the data is read in contactless mode by the internal RFID reader.

During a payment session, for example at a cashier in a retail store, the apparatus can execute a payment through its' contactless interface (RFID). This means that the ISO card is a pure contact smart card and the contactless technology is embedded into the wireless apparatus (100, 150).

For payment acceptance a PIN number can be entered via the keypad in the apparatus. Alternatively, a biometric sensor can compare fingerprint templates.

The wireless apparatus can also have a space for a Bluetooth or Zigbee dongle, which can be removed to insert into the USB port of a PC or any computing device. This means that the user simply inserts the Bluetooth or Zigbee dongle into an Internet connected computer and can download or upload content as required. The Bluetooth interface can also be used for sharing and exchanging songs, photos, images etc.

The wireless apparatus referred to herein is the RFID reader apparatus (100 or 150) using it's wireless interface to communicate.

Multiple Interface Radio Frequency Reader with Docking Station

US Patent Application US 2003/0000267, entitled Combined Mechanical and Electronic Key, in particular for Locks in a Vehicle, describes a combination key which makes it possible to actuate locks directly in a mechanical manner but also, either alternatively or supplementarily, to actuate them electronically, e.g., to actuate the particular lock in question or other locks from a remote location.

The pay-with-a-wave technology from American Express (AmEx), known as ExpressPay, is a contactless smart card in the form of an inch-long key fob that attaches to a key ring, links directly to an existing credit, charge or debit card to fund the purchase and operates without the need to swipe or insert a card in a mechanical reader. By just waving the key fob within 10 cm of a contactless reader at the checkout in a grocery store, the amount due on purchased goods is automatically booked from the holder's charge or credit card account.

In this embodiment of the invention, a multiple interface reader (100 or 150) is in the shape of a vehicle key having many, several or all of the following features:

electrical push button switches for remote control and active radio frequency identification, a flat USB stick which can project from a recess in a housing, a flash memory and or micro hard disk drive, an Infrared, Zigbee, Near Field Communication or Bluetooth interface, control LED(s), acoustic signal buzzer, a battery, and a slot to insert a transponder fob.

In another embodiment of the apparatus, a graphic display is incorporated in the multiple interface reader (100 or 150) to indicate "One Time Passwords" and the electronic purse or loyalty transponder fob balance.

Figure 4:
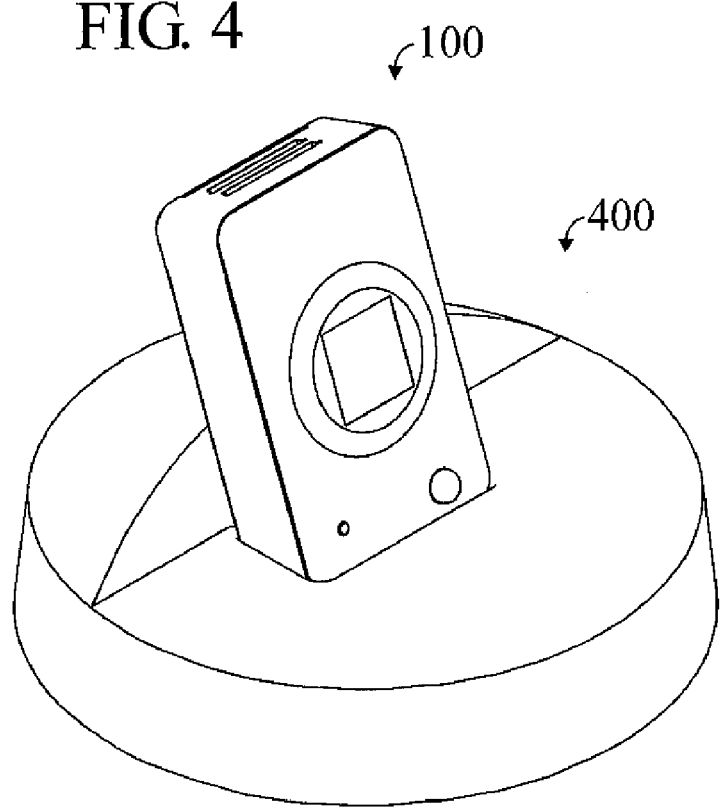
FIG. 4 is a perspective view of an RFID reader in a docking station, according to the invention.

As illustrated in FIG. 4, the multiple interface reader (100, 150) can be inductively coupled to a docking station 400 for recharging the battery and to enable communication via an interface with a host computer. The energy provided by the inductive coupling can be used to transmit data from the apparatus (100, 150) via its Bluetooth/Zigbee interface to a Bluetooth/Zigbee dongle inserted into a port of a host PC.

The Bluetooth/Zigbee dongle can have a cryptographic co-processor and embedded flash memory.

The multiple interface reader (100, 150) can also be paired with a Bluetooth/Zigbee dongle for PC locking, enabling & disenabling a DSL connection, web-identity (transport of authentication credentials), storing passwords, parental Internet control and firewall protection.

The contactless reader/coupler (100, 150) is compliant with all market standards such as ISO 14443 type A & B, MIFARE and ISO 15693, and is designed to read and write contactless fobs and smart cards. The firmware; instruction set, host communication protocol, command library, applications, cryptographic engines, etc reside in a flash memory and or micro hard disk drive.

The contactless reader referred to herein is essentially the multiple interface reader referred to elsewhere, which is essentially the RFID reader/vehicle immobilizer described hereinabove. The coupler refers basically to the motherboard of the reader. The talisman is also a reader apparatus. Other form factors, such as SD card, are discussed below.

The USB stick (104) can be mechanically latched securely in three positions, such as home position, 90° and 180° by pressing a push button which activates a spring-loaded pivot mechanism. The USB stick can move from its recessed home position in the housing into a working position, projecting from the housing, by simply pressing the push button (114).

The USB stick may be manually retractable like the vehicle key in patent application US 2003/0000267. When the user presses the button, the USB stick rotates about a pivot 180-degrees, and projects straight (in-line) out of its housing. The USB stick can then be inserted into the port of a PC.

The USB stick can manually be retracted back into the housing, optionally requiring pressing the same button to release a locking mechanism.

An alternate embodiment is when the button is pressed (once), the USB stick swivels 90-degrees from the housing (forming an "L" configuration with the housing), and when the button is pressed again (a second time), the USB stick swivels an additional 90-degrees to the 180-degree position.

In toll bridge or road applications, the user can use the apparatus to make a micro-payment by pressing the active switch which reads the transponder payment fob inserted in its housing and re-transmits the same encrypted RFID signal over a distance (active mode) to the transceiver at the tollbooth. The apparatus can also be used in ticket-based parking systems.

Multiple Interface Radio Frequency Reader with USB Memory Retractable Stick and Docking Station This embodiment of the invention describes the convergence of transponder, reader and mass storage technology in a single portable apparatus for logical & physical access, micro-payment and uploading or downloading electronic value or content through the virtual world of the Internet.

When the multiple interface reader (100, 150) is placed in its docking station (FIG. 4) and paired with the Bluetooth/Zigbee dongle in the USB port of an Internet connected PC, the reader can access the encrypted account data in the contactless fob, to allow the user to purchase services over the Internet. Alternatively, the retractable USB stick can be inserted directly into the USB port of the host computer.

In most applications, the user carries the reader with inserted transponder fob to a payment, transit or ticketing application.

In a practical example of using the ExpressPay contactless smart card in a grocery store environment which is in the form of an inch-long key fob that can be inserted into the apparatus and links directly to an existing credit, charge or debit card, the user can fund the purchase of groceries by just waving the reader/fob apparatus within 10 cm of a contactless reader at the checkout. The amount due on purchased goods is automatically booked from the holder's charge or credit card account. The user can acknowledge payment acceptance by pressing a push button switch.

ExpressPay operates in two different modes. One can directly link it to an American Express card account and each payment will be posted to that account. Alternatively, one can load value into the ExpressPay account from an American Express, MasterCard, Visa or Discover Card and each payment will be deducted from the prepaid account balance. The latter feature that allows consumers to pre-pay and "load" the device, is for those wary of having their entire credit limit attached to a bunch of keys.

The docking station operates on a principle such as is disclosed for the charging station for a rechargeable toothbrush, as described in the U.S. Pat. No. 6,798,169. The reader has also a Zigbee, NFC, Bluetooth or Infrared interface for communicating with other devices.

The multiple interface reader (100, 150) with inserted transponder in the shape of a vehicle key is an enhancement over conventional smart cards and USB tokens. It merges RFID reader technology with an identification device such as a transponder fob, and in addition allows for the storage of data and content which can relate to the encrypted data stored in the transponder.

Distinguishing Comments

US Patent Application 2001/0054148, entitled Field programmable smart card terminal and token device, describes a digital programmable smart card terminal device and token collectively known as the token device. The token device comprises a field programmable token device which accepts a user's smart card. The combination of token device and smart card may then be used for a variety of applications that include user authentication, secure access, and encryption. One specific application is that of an electronic wallet. The token device can be used both in connected and unconnected modes. In one embodiment, the invention comprises a field programmable electronic smart card terminal for allowing secure communication between a user and a host service, service provider, or application, comprising a token personality logic; and, a smart card reader adapted to receive and communicate with a smart card having stored thereon a user identification data, wherein with a smart card received by said smart card reader said token personality logic can generate a token device personality using said user authentication data; and, a communications mechanism for communicating an element of said token device personality to a service or application. Since the smart card terminal only gains its token personality when a smart card is inserted, manufacture and distribution of the terminal on a wide scale is possible.

Generally, US 2001/0054148 refers to a smart card terminal with the additional functionality of acting like a secure token. The smart card is inserted by the user to personalize the generic terminal (with user identification data) and transform it into a token for secure transactions when connected to a PC. It is simply a smart card terminal for example, for online-banking, whereby the user specific secrets are stored on the smart card.

Generally, the problem area being solved by the present invention is identification & payment whereby there is a clear divide between the intelligence of the RFID reader and the contactless smart card fob. Their functionalities are complimentary. The present invention use these components in combination in real world applications such as ticketing in the subway, access to an event, vending etc. US 2001/0054148 makes no mention of contactless, wireless or RFID At the time of US 2001/0054148, smart cards as electronic wallets were used for making electronic purchases and electronic payments. However, the problem at the time with this traditional type of smart card was that the electronic wallet needed to be "loaded" prior to use. Also at the time, there was a move by Banks and Financial Institutions to support the use of smart cards for home banking. This home banking application normally required the user to use a token to identify the user and/or to encrypt the user's communications with the bank. Therefore, there was a demand to offer to banking customers a home banking feature with an ability to remotely load the smart card.

There follows specific comments distinguishing the present invention from the teachings of US 2001/0054148. Specific numbered paragraphs [00###] of US 2001/0054148 are referenced, and commented upon (comment).

The smart card terminal and token device of US 2001/0054148 can be divided into two products:

1. A smart card reader acting as a generic token device. [0017] In one embodiment this generic token device is a self-powered unit that accepts smart cards, and has both an integrated display and keyboard. It can work in a connected or non-connected way. In a non-connected mode the user selects which applications to run and provides inputs (personal identification numbers, etc) if required. In a connected mode the token device acts as a slave to the user's personal computer (PC). The PC makes interrogations, asking questions, and the token provides answers.

2. [0018] A field programmable electronic smart card terminal for allowing secure communication between a user and a host service, service provider, or application provided by a service provider, comprising a token personality logic; and, a smart card reader adapted to receive and communicate with a smart card having stored thereon a user identification data, wherein with a smart card received by said smart card reader said token personality logic can generate a token device personality using said user authentication data; and, a communications mechanism for communicating an element of said token device personality to a service or application.

(comment) The reason behind the "token personality logic" integrated into the reader/terminal and operated in combination with a smart card is for secure communication with the online service provider and for user authentication.

[0033] The smart card reader or smart card terminal . . . can be used as a token that needs no programming of user-specific secrets. . . . Instead of pre-programming, the secret values used for authentication and user-host communication are instead derived from external parameters, such as identification data or secret values stored on the smart card itself (for example the card's serial number). The advantage of this procedure is that the smart card terminal can be shipped and put into distribution directly from the factory. A subscribing user gets his terminal and enters his card and the parameters, and secrets are set accordingly, creating a token (comment) This means that the smart card reader/terminal is not a token until the smart card is inserted.

[0046] In unconnected mode the token device supports time and/or event based dynamic passwords, challenge/response, and signatures, and acts as an electronic token or electronic wallet in it's own right.

(comment) The token device generates passwords and displayed them, but the smart card is required.

[0061] External Interface. [0062] A universal serial bus (USB) connection is optionally available for interface with a personal computer (PC). Alternatively, any of infra-red (IR), parallel, serial, or other connections may be implemented. The connector can be integrated into the token device housing.

(comment) US 2001/0054148 makes no mention of contactless or wireless interfaces For maximum compatibility with current standards the smart card reader must accept full sized cards that conform to ISO 7810 specification.

(comment) The present invention uses a contactless fob and not a credit size contact smart card.

An internal clock 160 is required for token device time-dependent application such as time-based passwords, time based signatures etc. The internal clock is powered by an internal battery. The clock is internally set to Greenwich mean-time (GMT) during production.

(comment) The internal clock is not synchronized with an external Atomic clock and battery change causes a problem.

[0037] If the card is removed from the token device, all secrets are immediately erased, and the device reverts back to being a regular smart card terminal (i.e. it no longer acts as a token). (See also Claim 2) The terminal of claim 1 wherein said token device personality is erased when the smart card is removed from the smart card reader (comment) Without the smart card the reader/terminal has no intelligence.

In US 2001/0054148, the smart card (contact smart card) is inserted by the user to personalize the generic terminal (with user identification data) and transform it into a token for secure transactions when connected to a PC. It is simply a smart card terminal for example, for online-banking, whereby the user specific secrets are stored on the smart card.

In the present invention, the contactless smart card fob holds information about the user, but does not create a token functionality in the RFID reader apparatus. In fact, our apparatus acts as a secure token in myriad of applications ranging from physical & logical access to payment.

Portable Wireless USB Terminal with Slots to Insert an EMV Card and Wireless Application Protocol Identity Module There is described hereinabove a portable wireless apparatus (100, 150) with a slot to insert an EMV-based authentication card for payment purposes.

There are two main wireless platforms that are being championed to fuel future services—SIM Toolkit (STK) and Wireless Application Protocol (WAP), which allows connectivity between the mobile world and the Internet.

Wireless Application Protocol Identity Module (WIM) is being considered as the new type of SIM card for accessing, authorizing and controlling mobile WAP-based services. It adapts a Public key Infrastructure (PKI) based security architecture on a WAP security module.

WIM is a security module implemented in the SIM card for WAP (Wireless Application Protocol) applications. WIM provides security services for WAP applications, and allows you to use digital signature. SIM cards with security module are provided by the SIM card issuer.

With authentication, security and personalization functions incorporated in the WIM card, it will be possible to transform a handset or terminal into a personal Internet tool, to access the world's information and transaction hub.

In this embodiment of the invention, the portable wireless apparatus (100, 150) not only has a slot for a payment card, but also a slot, hatch or recess for a WIM card. This combination of PKI and EMV debit/credit infrastructure allows users to access services offered through the Internet and other networks with the highest security. The payment card verifies the cardholder with a PIN code and then generates for example a digital signature of the transaction that the customer wishes to make.

The technique described is a secure mechanism by which to identify a user or to encrypt the user's communications with their bank. Therefore, the user can remotely load electronic cash from their account onto the contact/contactless card via the wireless Internet or make a debit/credit payment for content or services purchased.

This embodiment of the invention is intended for the mass market, for consumers in any e-payment application, using the USB, contact, contactless, Zigbee, NFC, Bluetooth or wireless interface(s), by insuring the identity of the user and the authentication of the transaction.

Docking Station Powered by Inductive Coupling to Accommodate a Pendant RFID Reader, Contactless Fob and Dual Interface Smart Card If the reader (100, 150) is "passive" (has no battery of its own), and is positioned in the cradle of the docking station (FIG. 4) and power up through the inductive coupling, it can communicate with any Bluetooth/Zigbee enabled device, such as a dongle, PC, phone or any mobile computing device. The docking station can also have slots for a transponder fob and an ISO smart card. The reader can communicate with the fob and smart card in contactless mode, while at the same time interfacing with an Internet connected PC to perform such applications as online banking, e-commerce, etc.

Alternatively, an "active" reader (100, 150), with a battery of its own, can be positioned in the cradle and the internal battery charged through inductive coupling. Such an active device can also incorporate a biometric sensor for logical and physical access, by comparing templates either stored in the reader or fob. In access control, the reader can have a remote control button to transmit the Wiegand protocol for authorized entry.

RFID Reader Module in the Form Factor of a Secure Digital (SD), Mini-SD, Multimedia (MMC), Reduced Size Multimedia (RSMMC) or Smart Media Card (SSFDC) for Insertion into a Slot in a Mobile Telephone with Digital Camera.

Existing on the market are contactless short range read/write RFID Reader Modules with Compact Flash (CF) Communication Interface and built-in antenna, which via an adapter can be inserted into a PCMCIA slot of any mobile computing device. They support a wide range of RFID standards such as ISO 14443 A & B, 15693 and Mifare Tag-ICs as well as being compliant with major standards such as ISO 7816, PC/SC, Microsoft WHQL, and EMV specifications. They are intended for use in PC applications such as logical access control, digital signature, GSM authentication, secure banking and online transactions, loyalty programs, and health care solutions. Used with PCs, notebooks, servers, personal organizers and set-top boxes.

For example, the company "Tiscor", a division of Brady, markets a mobile telephone housed in a RFID reader shell. By touching an RFID tag with the cell phone reader, mobile security personnel can account for their attendance at checkpoints in real time and record detailed discrepancies related to specific inspection locations.

In Seoul Korea, the users of transportation fobs such as T-Money attach the passive transponder device to their mobile telephone for convenience. The transportation fob basically dangles from the mobile telephone.

The company "Digital Defense" has developed an on-card self-enrolling biometric card (active device) having compatible interfaces with Wiegand protocols, Mifare, ISO 14443 type A & B as well as a flash memory drive for storing biometric data. (www.mydigitaldefense.com)

In a press release from Matsushita Electric Industrial in October 2004, the company announced under its Panasonic brand, the development of an SD memory card with contactless smart card capability. The emphasis was on a memory card incorporating an RFID tag for identification. Cell phones also incorporate RFID tags such as the handset 5140 from Nokia.

This embodiment of the invention combines an RFID reader in the form factor of a SD stick, a mobile telephone with digital camera and a passive transponder card similar in design to a T-Money fob for security identification and access control solutions. (In this case, the reader is an SD I/O device for insertion into an SD slot in a mobile telephone with camera or personal digital assistant (PDA). The reader communicates with the external fob and facial images taken by the camera are checked against the template in the fob. Only when a live image coincides with the stored image is an authorization signal transmitted from the mobile phone to an access control terminal or kiosk.)

The integrated camera in the mobile telephone can be used for digital imaging (face recognition), for the purpose of comparing the photo identification stored in the passive contactless fob and a real time photo taken of the mobile phone user. Templates are compared by the RFID reader and authentication verified for logical or physical access. This feature is comparable to the biometric fingerprint personalization, described hereinabove.

In another embodiment of the invention, the mobile telephone has an optical scanner or silicon biometric sensor (chip on glass—nanotechnology sensor) built into the display and communicates with the contactless fob via the internal RFID reader (comparable to 100) inserted into the SD slot of the mobile telephone. The user places a finger or thumb on the display to initiate authentication.

The biometric template is stored on the passive contactless fob and compared to the template produced from the live sample taken from the mobile telephone for quick and easy authentication of the user's identity.

Mobile Telephone with Digital Camera, Biometric Sensor & NFC Interface

As an alternative to the abovementioned, the mobile phone with biometric sensor built into display, can communicate with an external portable access control reader via near field communication (NFC).

Intelligent Wireless Client or Access Point

The convergence of digital technology as described hereinabove, by merging RFID with wireless technology and mass storage, is equally applicable to WLAN devices (802.11 a/b/g, 802.11i, MIMO, 802.11n) such as a wireless client, access point or router. By integrating mass storage and RFID into a USB wireless client, a plethora of new applications emerge.

RFID Reader Module

Dual Interface (Contactless & Contact) Smart Card in Secure Digital Card Format

This embodiment of the invention is the convergence of dual interface smart card technology with SD Card technology, offering two different interface options: contact interface ISO 7816 with a SD signal pin-out and contactless interface ISO 14443. The device can support RSA, ECC and secret-key encryption methods, for example, triple DES and its successor AES.

An SD Memory Card measures 24 mm by 32 mm by 2.1 mm. The miniSD™ Card, measuring 20×21.5×1.4 mm (W×L×T), is a smaller factor of the SD Memory Card.

The SD card can also have a slot for the insertion of an ISO SIM card with 6 pins for contact mode and 8 pins for contactless mode.

The SD card can have a key hole for attachment to a key ring, similar in design to an RFID key-fob.

This embodiment of the invention is generally a contactless SD card with contacts (dual interface) and the possibility of inserting an SIM card into the SD housing Active USB Apparatus with Secure Digital I/O Slots to Accommodate a SD RFID Reader, a SD Memory Stick and a SD 802.11 N (Pre-N MIMO), A/B/G Wireless LAN Card There is described hereinabove a RFID reader module in the form factor of a Secure Digital (SD) or Mini-SD for insertion into a slot in a portable device such as a mobile telephone with digital camera.

This embodiment of the invention is an active apparatus which accommodates the insertion of SD cards and merges WLAN technology with RFID.

Transponder, Bluetooth, UWB or NFC SD sticks can also be inserted into this mobile multiple interface apparatus.

Mobile Telephone with Stereo Digital Camera

By using a stereo digital camera, 3D facial geometry (three dimensional output) is feasible for secure identification. The transmission of the digital facial image from the mobile telephone can be, for example, through NFC, Bluetooth or Ultra Wide Band to a reader or terminal Generation of "One Time Passwords" by a Wireless Apparatus with RFID & USB Interface In U.S. Ser. No. 10/990,296 filed Nov. 16, 2004 (published as 20050109841 May 26, 2005), public & private key infrastructure (PKI) for secure authentication has been discussed.

The alternative to PKI is the generation of "One Time Passwords" (OTP), based primarily either on an event (session or transaction) or on time.

As described hereinabove, it is stipulated that a "One Time Password" can be generated when the active apparatus enters an electromagnetic field for radio frequency identification. In building on this concept of field specific generation of passwords for authentication purposes, it is proposed that such generation of passwords be applied when accessing or entering a wireless network.

The generation of passwords can be encrypted with the internal transponder code and the MAC address of the wireless client.

Remote Power-Up of a SOHO (Small Office/Home Office) PC

Using a wireless active USB device (such as 162) with Media Access Control Address, it is possible to power-up a PC in sleep mode so as to access data from a remote location. The mechanical interface to the SOHO PC is not restricted to a universal serial bus connection. With AES or WEP encryption in a virtual private network, data residing on the SOHO PC can be safely transferred to a remote computing appliance.

This wireless active USB device can also act as a WLAN adapter and storage device.

ExpressCard with RFID, Wireless LAN and Mass Storage

PCMCIA (Personal Computer Memory Card International Association) developed the ExpressCard standard to carry forward the benefits of "plug-in" I/O cards to the next generation of personal computing devices. In expanding on this standard, it is proposed that the format of the ExpressCard/34 is ideally suited for the combination of RFID and Wireless technology, supporting both USB and PCI Express interfaces.

Authenticating Identity & Validating a Person's Privileges Using an Active RFID/Wireless Client with Mass Storage U.S. Pat. No. 6,766,450, entitled Certificate Revocation System and assigned to CoreStreet, describes a method of managing certificates in a communication system having a certifying authority and a trusted directory. The primary objective is to facilitate management of public key certificate revocation without providing users with lists of revoked certificates.

In any secure transaction, the identity management system must establish if a person is who they say they are. This is the authentication step and most often involves passwords, biometrics (fingerprints, iris scans, facial recognition) personal identification numbers (PIN), digital certificates and tokens. The next step is to validate the person's privileges, and as privileges change with time, a dynamic validation system is required.

This embodiment of the invention is directed to a method to validate whether a person is allowed to access a network (logical access) or enter a facility (physical access) using the combination of radio frequency identification and wireless LAN technology. In application, it can be used to revoke certificates in a communication system.

As described hereinabove, the active apparatus (100, 150) with USB/FireWire connection (such as 104), contactless and wireless interfaces can be used for logical and physical access as well as serving as an electronic wallet for payment applications. The authentication process for accessing a network or entering a building can follow the same procedure as with standard smart cards and secure tokens.

Real time upgrading & revoking of privileges or authorizing certain activities and access permissions can be implemented when the user is in a WPAN (wireless personal area network) or a WLAN (wireless local area network) such as a hot spot or office building. Revoking or granting of privileges can be via the wireless interface of the apparatus and such messages can be embedded in the EEPROM of the RFID device or in mass storage. The transmission of real time credentials can be via the host, contactless or wireless interface.

The apparatus can also be used to store revoked privileges from other individuals and the embedded data (digitally signed validation information) can be fed into a decentralized identity management system when the apparatus is in use.

The privileges referred to herein are stored on the contactless smart card fob and have to be updated on a regular basis. As the fob is inserted into the RFID reader apparatus, the privileges are upgraded or revoked by communicating in wireless mode with a central server and then with the fob in contactless mode with these updates.

The conditions by which a "check of privileges" is triggered can be based on an event, count, time or being in a specific field (RFID or Wireless), resulting in communication between the apparatus via one of its interfaces and the decentralized reader/terminal or centralized trust center or server. The verification of privileges is similar in operation to the generation of "One Time Passwords", but the proof of credentials comes from a decentralized or centralized system.

Privileges can be dynamic (changing over time) or static (constant, but expire after a certain period or event). Static privileges can be time and date based, which means the apparatus checks the status when interfacing with a reader, terminal, server or access point.

In passive transponder applications such as e-passports, e-visa for non visa-waiver countries, loyalty or membership cards and contactless smart cards, the static privileges can be stored in a separate RFID chip (with built-in clock) from the chip which holds pertinent information about the passport holder including a digital image of one or more of their biometrics (facial image, fingerprint, iris).

In the production process of the e-passport or contactless card, the inlay can accommodate both chips with antenna. The "privileges chip" can also be used for authentication purposes in pre & post personalization.

The pertinent objects of the present invention as described above should not be construed to be merely illustrative of some of the more prominent features and applications of the invention.

SDIO Slots

There is described hereinabove an active USB Token with Secure Digital I/O Slots to accommodate a SD RFID reader, a SD Memory stick and a SD 802.11 n (pre-n MIMO), a/b/g Wireless LAN Card In this embodiment, the RFID reader (100) is in the form factor of a SD device for insertion into the housing of the apparatus. In the previous embodiments of the apparatus, the RFID reader was integrated into the housing and thereby not removable.

The typical SDIO Wireless LAN card (802.11 b/g, 2.4 GHz band, with data rates of 11/54 Mbps respectively) has the dimensions 38.3×24×2.1 mm with an average operating power consumption of less than 150 mA. The mini SDIO WLAN Card has the dimensions 28×20×1.4 mm and the micro version has the dimensions of 22×11×1 mm.

Transponder, Zigbee, NFC, Bluetooth, WLAN or UWB SD sticks can also be inserted into this mobile multiple interface apparatus.

RFID Agnostic

The RFID Reader apparatus (100, 150) can emulate Multiple ISO Standard Protocols (Mifare, ISO 14443, ISO 15693, etc) by storing the communication protocols and the modulation type of each transponder type in memory, at mask level or in any other non-erasable memory form. This concept of emulating the RFID protocols is called RFID agnostic.

TCP/IP Path

The internal wireless device can convert TCP/IP signals to USB signals or alternatively USB serial data directly into Ultra Wide Band radio signals.

Internet Atomic Clock

Via its wireless interface, the RFID reader apparatus (100, 150) can synchronize itself with an Internet atomic clock, allowing every event & transaction to be recorded with an exact time/date stamp.

Field Generated "One Time Passwords" for Authentication

The alternative to Public key Infrastructure is the generation of "One Time Passwords" (OTP), based primarily either on an event (session or transaction), on time or on count.

The present invention differentiates from time, event and count based OTPs, in the sense that the generation of passwords is dependent on the location of the user, the application and the required level of security. The encryption engine which generates the OTPs resides in the non-volatile memory of the hub controller, or alternatively in the flash memory, EEPROM or in a removable mini intelligent stick.

When the apparatus (100, 150) is in an electromagnetic field for radio frequency identification, the apparatus generates a "One Time Password" for a contactless transaction, such as a micro payment or physical access control to a secure building.

The OTP contains a unique identification header (tag) relating to the application and a random generated password, for authentication by the server processing the micro payment. The server in turn signals the other application servers that an incremental OTP has been processed.

Unlike standard "One Time Password" tokens, which require a battery for operation, the multiple interface token can generate passwords when powered up by the electromagnetic field generated by a RFID reader.

OTP Generation in a Wireless Network

The apparatus can generate a "One Time Password" when in an electromagnetic field or in a wireless hotspot. Each password can be synchronized or encrypted with the time from a public NTP server (Internet Atomic Clock).

Biometric Membrane Sensor with Actuator Switch

In provisional application No. 60/520,698 filed Nov. 17, 2003, reference is made to a "smart fob" which could store a biometric template—such as fingerprint, iris scan etc., in a memory cell that is locked and when using the "smart fob" to gain access to a controlled area, the user touches his finger to a reader, waves the "smart fob" in front of a reader, the finger print is compared to the stored info, the user's identity is verified, and he is granted access.

In expanding on the concept of integrating a fingerprint reader for biometric verification, it is disclosed in this embodiment of the invention that the biometric reader is a flexible membrane sensor which when depressed by the user activates a switch to power-up the RFID reader, to measure a live biometric parameter (e.g. finger- or thumbprint) of an unverified user, to compare the stored biometric template of the authorized user in the memory of the reader (100, 150) or contactless smart card fob (116, 166) with the measured data and to confirm a transaction by sending a contactless or wireless authorization signal.

The fingerprint silicon type sensor is flexible, firstly to accommodate the contour of the fingerprint or thumbprint and secondly to allow the activation of the measurement pattern system. The sensor can for example be a capacitive area or swipe sensor. The surface of this capacitive sensor is an array of plates able to measure the capacitance between the plates and the finger's ridges or valleys.

Alternatively, a slide switch can be used to protect the biometric sensor and when revealed activates the apparatus.

Single Sign-on

Most consumers have too many passwords (e.g. online banking, email accounts, brokerage accounts, buying online, etc) to remember. And in a perfect world you would have unique passwords for each site and change them often to foil hackers, but in reality about 70% of consumers use fewer than five passwords for all of their electronic systems, and 20% use the same password for everything.

Given that the contactless smart card fob is issued by a financial institute, it is possible to personalize the fob with keys (Login ID, Password, PIN) for a number of partnership or alliance websites, before issuance to the card holder.

The keys stored in the memory of the contactless chip are encrypted and changed on a regular basis (weekly or monthly) in synchronization with an Internet atomic clock.

After the consumer receives the contactless fob for insertion into the RFID reader apparatus and loaded with the ever-changing (dynamic) keys, the consumer can then program the apparatus only to operate when the biometric identifier measures a live fingerprint that matches with the stored fingerprint template in the memory of the reader or contactless smart card fob.

The initialization procedure may also require a Personal Identification Number to unlock the system.

It is also possible that the consumer has several contactless smart card fobs for automatically logging into a group of password protected sites.

Power Optimization

To save on power consumption the RFID reader apparatus can receive or transmit data via its wireless interface on a periodic basis as well as powering down during periods of inactivity (sleep mode). The apparatus can also monitor and record environmental parameters such as temperature and humidity. If the apparatus is lost, location determination (Real-Time Location System) is possible when in a WiFi network. In addition to location calculation, the RFID reader apparatus can use its wireless interface to receive configuration data making it field upgradeable.

USB Apparatus with Bluetooth or Radio Frequency Interface and Memory

This configuration relates to the combination of a wireless Bluetooth USB adapter interface or a radio frequency adapter interface for communicating with Bluetooth or radio frequency enabled products such as a mice, keyboard, remote control, wireless presentation devices, etc and the simultaneous storage of data or content in the memory of the USB apparatus, avoiding the need to having a separate USB memory stick or accessing data in the PC.

Presentations or auto-run applications can be stored in the memory of the USB apparatus with Bluetooth or radio frequency interface.

USB Apparatus for GPS Rental Services

In some countries, GPS is expensive and seldom used by the vehicle owner, only when traveling on vacation. To provide a means for everyone to avail of GPS, a USB apparatus storing customer details, payment method, maps, auto-run instructions, alternative route suggestions, web links, updates and access to the board computer is an alternative option. The USB apparatus can be rented for the duration of the travel or can be uploaded at the user's convenience from a participating merchant.

USB Apparatus to Marry Logical & Physical Access

Most access control cards are contactless and in the shape of a credit card. On the other hand, logical access cards for network security, especially in legacy systems, can be in the form of a contact chip card for insertion into a terminal. The dual interface card combines contactless and contact technology into a single device, but still requires a terminal for PC connection. In the present invention, it is proposed to integrate a contact chip card, RFID and USB interface into a single card in the shape and form of a credit card. Thickness of the card is slightly thicker than an ISO card, so as to accommodate the USB connector (mini, or standard). Using the reverse motion system or slide push mechanism, a contact card can emerge from the card housing, for insertion into a payment or non payment terminal. As already described the operating system, memory management (shared) and applications are accessible from either of the three interfaces. The apparatus can be passive or active and wireless interfaces are also possible.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Method of using an RFID reader comprising:
   providing an RFID reader apparatus having a contactless interface, a slot for insertion of a contactless smart card fob, a biometric interface and a biometric sensor; and
   disposing a switch under the biometric sensor for powering up the RFID reader apparatus when the biometric sensor is being used;
   further comprising:
   the RFID reader apparatus can enter several password protected sites or networks with a "Single Sign-on" by comparing a live and a reference fingerprint for authentication and reading the credentials and privileges stored in the contactless smart card fob for authorization to an access restricted site or network; and
   updating encrypted keys for access to password protected sites in synchronization with an Internet Atomic Clock.

2. The method of claim 1,
   further comprising:
   providing a wireless interface; and
   providing a slot for insertion of a wireless secure digital (SD) I/O device.

3. The method of claim 1,
   wherein the apparatus is pocket-size.

4. The method of claim 1, further comprising:
providing the apparatus with an interface for interfacing with an Internet-capable appliance; and
the interface with the Internet-capable appliance in a Private Area Network is selected from the group consisting of Zigbee, NFC, Bluetooth, Ultra Wide Band (UWB), wireless USB, Infrared; and
the interface with the Internet-capable appliance for a Local Area Network is selected from the group consisting of 802.11 a/b/g, 802.11n and Worldwide Interoperability for Microwave Access (WIMAX).

5. The method of claim 1, further comprising:
emulating Multiple ISO Standard Protocols (Mifare, ISO 14443, ISO 15693, NFC, etc) by storing the communication protocols and the modulation type of each transponder type in memory, at mask level or in any other non-erasable memory form.

6. The method of claim 1,
further comprising:
Providing the apparatus with extended memory selected from the group consisting of EEPROM, (NAND) flash memory and hard disk drive (HDD).

7. The method of claim 1, further comprising:
the RFID reader apparatus can generate Transaction Authentication Numbers (TAN) and One-Time-Passwords (OTP) when in an electromagnetic field, in a wireless hotspot and can synchronize itself with an Internet atomic clock, for the purpose of time synchronous password generation and for recording events & transactions with an exact time/date stamp.

8. The method of claim 1, further comprising:
the RFID reader apparatus can validate whether a user is allowed to access a network (logical access) or enter a facility (physical access) using a wireless interface; and
real time upgrading & revoking of privileges or authorizing certain activities and access permissions can be implemented when the user is in a WPAN (wireless personal area network) or a WLAN (wireless local area network).

9. The method of claim 1,
further comprising:
a slot for receiving a secure digital (SD) card; and
the SD card has a hatch for receiving a SIM card, and performs a secure token function.

10. The method of claim 1,
further comprising:
a slot for receiving a secure digital (SD) I/O card; and
the SD I/O card has a hatch for receiving a SIM card, and performs a secure token function.

11. The method of claim 1, further comprising:
the RFID reader apparatus can perform one or more of the following functions:
monitor and record environmental parameters and can receive or transmit data via a wireless interface in periodic sessions to optimize power consumption;
store medical images in DICOM (Digital Imaging and Communications) standard file format; and
incorporate a real-time location system for patient location determination when an alert button is pressed.

12. The method of claim 1,
wherein:
the apparatus has a slot, hatch or recess for a WIM (Wireless Application Protocol Identity Module) card.

13. The method of claim 1, further comprising:
personalizing the RFID reader apparatus at two levels, firstly by inserting the contactless smart card fob with a cardholder's credentials into the reader apparatus to give it a first layer of personality and secondly at an initialization stage, by the cardholder taking a digital imprint of their finger or thumb and storing the digital imprint in the memory of the RFID reader apparatus.

14. The method of claim 13, further comprising:
initiating a transaction with an external entity by the user pressing on the biometric sensor, which then measures a current fingerprint pattern for the user pressing on the biometric sensor; and
acknowledging a transaction by comparing the current measured fingerprint pattern with the template of the authorized user's fingerprint which is stored in the memory of the RFID reader; and
sending a contactless or wireless authorization signal to the external entity.

15. The method of claim 1, further comprising:
storing a biometric profile of a user in the RFID reader apparatus, thereby making the apparatus unique to the user, as it authenticates the identity of the smart card holder by sensing the smart card user's fingerprint and comparing it with the user's biometric profile stored in its memory.

16. The method of claim 15, further comprising:
turning on the RFID reader apparatus when the biometric sensor is being used.

17. The method of claim 1, further comprising:
inserting a removable secure digital (SD) I/O device into the RFID reader apparatus, for wireless communication.

18. The method of claim 1, further comprising:
inserting a removable memory device into the RFID reader apparatus, for allowing the user to transport data from the RFID apparatus to another apparatus.

19. The method of claim 1, further comprising:
providing a mechanical connection (contact) interface.

20. The method of claim 1, further comprising:
providing an electronic immobilizer within the RFID reader apparatus for authenticating the user to perform a function in an external entity.

21. The method of claim 1, further comprising:
inserting the smart card fob with a cardholder's credentials into the reader apparatus;
taking a digital imprint of the cardholder's finger or thumb; and
storing the digital imprint in a memory of the smart card fob.

\* \* \* \* \*